(12) United States Patent
Ishimoto et al.

(10) Patent No.: US 6,862,118 B2
(45) Date of Patent: Mar. 1, 2005

(54) LIGHT-CONDENSING DEVICE, LIGHT-CONDENSING SYSTEM AND IMAGE READING APPARATUS

(75) Inventors: Kiyoshi Ishimoto, Hino (JP); Hisashi Yonekawa, Hino (JP)

(73) Assignee: Konica Corporation, Tokyo (JP)

( * ) Notice: Subject to any disclaimer, the term of this patent is extended or adjusted under 35 U.S.C. 154(b) by 863 days.

(21) Appl. No.: 09/824,739

(22) Filed: Apr. 4, 2001

(65) Prior Publication Data

US 2001/0028477 A1 Oct. 11, 2001

(30) Foreign Application Priority Data

Apr. 5, 2000 (JP) ........................................ 2000-103904

(51) Int. Cl.[7] .......................... H04N 1/04; H04N 1/21; G01J 1/00; G01N 23/04
(52) U.S. Cl. ...................... 358/481; 250/586; 250/228; 250/584; 250/585; 358/302
(58) Field of Search ................................ 358/481, 302; 250/228, 584, 585, 586

(56) References Cited

U.S. PATENT DOCUMENTS

| | | | | |
|---|---|---|---|---|
| 4,613,753 A | * | 9/1986 | Okada et al. | 250/236 |
| 6,078,041 A | * | 6/2000 | Kotani et al. | 250/228 |
| 6,180,955 B1 | * | 1/2001 | Doggett et al. | 250/586 |

* cited by examiner

Primary Examiner—Edward Coles
Assistant Examiner—Houshang Safaipour
(74) Attorney, Agent, or Firm—Finnegan, Henderson, Farabow, Garrett & Dunner, L.L.P.

(57) ABSTRACT

The present invention concerns a light-collecting device equipped in an information reading system for reading, for instance, the radiation image information stored in a photo stimulable storage phosphor sheet. The light-collecting device includes a reflector, shaped like a longish cylinder, a surface of which is a light-reflecting surface finished as a mirror surface; and a photo-detector to detect light residing inside the reflector. The reflector includes a light-incoming aperture to guide light inside the reflector, and a perpendicular line at the light-incoming aperture is shifted from a center line of a cross-section perpendicular to a longitudinal direction of the reflector.

47 Claims, 13 Drawing Sheets

FIG. 8 ( a )
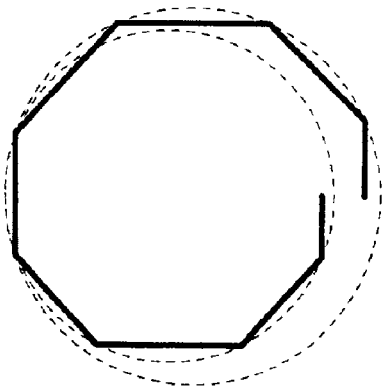
FIG. 8 ( b )
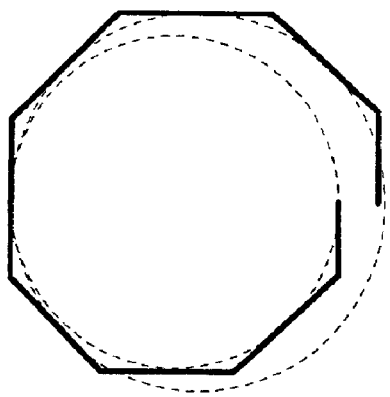
FIG. 9
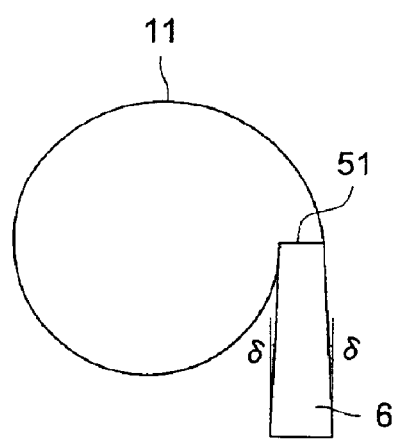

COMPARISON OF LIGHT-CONDENSING EFFICIENCIES WHEN THE LIGHT REFLECTING EFFICIENCY IS 98%

LIGHT-CONDENSING DEVICE, LIGHT-CONDENSING SYSTEM AND IMAGE READING APPARATUS

BACKGROUND OF THE INVENTION

The present invention relates to an image information reading system to read, for example, the radiation image information stored in a photo stimulable storage phosphor sheet and the image information recorded on an X-ray film and printing film. It also relates to a light-collecting device and light-collecting system used in said image information reading system.

Conventionally, the following image information reading system has been put into practical use: Beam such as laser beam is scanned two-dimensionally on the sheet where image information is recorded, and beam is applied to the sheet. The light containing the image information obtained therefrom is detected by a light detecting means such as a photomultiplier. The image information recorded on the sheet is read out by said image information reading system.

Said image information reading system includes a printing plate scanner, an X-ray film scanner and a radiation image reading system to read the radiation image information recorded on the photo stimulable storage phosphor sheet.

The following description mainly concentrates on the radiation image reading system using the photo stimulable storage phosphor sheet:

When radiation is applied, part of the energy of radiation is stored. If stimulating lay such as visible light is applied thereafter, the light according to stored energy is emitted by a photo stimulable storage phosphor. Using this photo stimulable storage phosphor, radiation image of a subject such as human body is photographed and recorded on the sheet-formed photo stimulable storage phosphor. The photo stimulable storage phosphor sheet is scanned by stimulating lays such as laser to obtain the light emitted by the stimulable phosphor, which is subjected to photoelectric reading to get an image signal. Based on this image signal, the image signal of the subject is displayed on the recording medium such as photosensitive material or CRT as a visible image. Such a system is put into practical use.

A radiation image reading system used in said system comprises (1) a scanning optical system to apply stimulating lays to a photo stimulable storage phosphor sheet storing radiation image information, (2) a photo-detector to detect the light emitted by the stimulable phosphor by application of stimulating lays, and (3) an optical guide to lead the light emitted by the stimulable phosphor to said photo-detector.

In said system, the energy of the light emitted by the stimulable phosphor by application of stimulating lays is very weak and non-directional. The SN ratio of radiation image obtained from the reading system greatly depends on the energy received by the photo-detector. What is important in the design of this system is how to effectively lead this weak light emitted by the stimulable phosphor to the photo-detector. Various methods have been proposed by many companies.

(1) A means of improving the efficiency at which the light emitted by the stimulable phosphor is transmitted to the photo-detector (hereinafter referred to as "light-collecting efficiency") is exemplified in Japanese Patent Laid-open NO.16667/1987, which discloses an image reading system. This system has a light receiving surface extending along the horizontal scanning line, and is characterized by having a long photomultiplier arranged close to the photo stimulable storage phosphor sheet, and a reflective optional member which reflects the light emitted by the photo stimulable storage phosphor sheet toward said light receiving surface.

In this case, it is possible to avoid reduction of light-collecting efficiency by generating a reflection enhancing film on said reflective optional member or by generating a reflection preventive film on the end face of a light guiding sheet-formed member such as a polymethyl methacrylate (PMMA) plate. Said light guiding sheet-formed member is of a flat plate, and all the incoming light emitted by the stimulable phosphor is basically reflected inside without leaking outside.

Further, the light receiving surface of a longer photomultiplier is sufficiently long in the horizontal scanning direction, and is sufficiently wide with respect to the ongoing surface of the light guiding sheet-formed member. So almost all the light, emitted by the stimulable phosphor and coming from the light guiding sheet, reaches the photo-detector. This ensures basically excellent light-collecting efficiency.

(2) U.S. Pat. No. 5,598,008, for example, discloses the radiation image reading system to read the radiation image information stored on the photo stimulable storage phosphor sheet, wherein an elongated and axially symmetry light-collecting device is coated internally with diffusion reflecting substance.

However, the prior art of said configuration has the following problems:

(1) The system disclosed in the Japanese Patent Laid-open NO.16667/1987 has a longer photomultiplier with complicated structure, which is far more expensive than the general small-sized photomultiplier. This raises system costs.

(2) The system disclosed in the U.S. Pat. No. 5,598,008 can be manufactured at a lower cost. By contrast, a problem of big attenuating of incident light is caused by a great amount of leakage from the aperture for scanning of stimulating lays, and a great number of reflections inside the light-collecting device to reach the photo-detector. When a system is designed, the reading time must be made longer in order to get the SN ratio of image.

Further, according to this patent, the light-collecting device is installed close to said sheet. When the system is designed, flexibility is reduced in the layout of the light-collecting device. Designing may be difficult, depending on the type of said reading system.

(3) When the light-collecting efficiency is low in the image information reading system (scanner) such as X-ray film having a laser scanning system, reading time is prolonged to improve the SN ratio of image. The SN ratio of image is reduced if the reading time is reduced.

SUMMARY OF THE INVENTION

The present invention has been made to solve the above problems. The first object is to provide a small sized low cost image reading system, light-collecting system and light-collecting device, without using a large sized light-collecting equipment having a complicated configuration or a high-priced longer photomultiplier (photo-detector) or large-diameter photomultiplier (photo-detector).

The second object is to provide an image reading system, light-collecting system and light-collecting device characterized in that the light including the image information obtained by scanning on the sheet where image is recorded the light emitted from the photo stimulable storage phosphor sheet or laser can be sent to the photo-detector with high efficiency. These apparatuses are further characterized in that the image information with excellent SN ratio can be obtained and image information reading time can be reduced.

The third object is to provide a light-collecting system and image information reading system characterized by flexible system configuration where the light-collecting device need not be laid out close to said sheet.

Accordingly, to overcome the cited shortcomings, the abovementioned objects of the present invention can be attained by light-collecting devices described as follow.

(1) A light-collecting device, comprising: a reflector, shaped like a longish cylinder, a surface of which is a light-reflecting surface finished as a mirror surface; and a photo-detector to detect light residing inside the reflector; wherein the reflector comprises a light-incoming aperture to guide light inside the reflector, and a perpendicular line at the light-incoming aperture is shifted from a center line of a cross-section perpendicular to a longitudinal direction of the reflector.

(2) The light-collecting device of item 1, wherein the light-reflecting surface comprises at least two arc surfaces whose radiuses of curvatures are different relative to each other.

(3) The light-collecting device of item 1, wherein the light-reflecting surface comprises a plurality of plane surfaces, which are inscribed or circumscribed onto at least two arcs whose radiuses of curvatures are different relative to each other.

(4) The light-collecting device of item 1, wherein an area of the cross-section perpendicular to a longitudinal direction of the reflector increases as the cross-section shifts towards an end section of the reflector, at which the photo-detector is disposed.

(5) A light-collecting device, comprising: a reflector, shaped like a longish cylinder, a surface of which is a light-reflecting surface finished as a mirror surface; and a photo-detector to detect light residing inside the reflector; wherein the reflector comprises a light-incoming aperture to guide light inside the reflector, and an area of a cross-section perpendicular to a longitudinal direction of the reflector increases as the cross-section shifts towards an end section of the reflector, at which the photo-detector is disposed.

(6) The light-collecting device of item 5, wherein the light-reflecting surface comprises at least two arc surfaces whose radiuses of curvatures are different relative to each other.

(7) The light-collecting device of item 5, wherein the light-reflecting surface comprises a plurality of plane surfaces, which are inscribed or circumscribed onto at least two arcs whose radiuses of curvatures are different relative to each other.

(8) A light-collecting device, comprising: a reflector, having a light-incoming aperture and shaped like a longish cylinder, a surface of which is a light-reflecting surface finished as a mirror surface; and a photo-detector to detect light residing inside the reflector; wherein the light-reflecting surface comprises either at least two arc surfaces, whose radiuses of curvatures are different relative to each other, or a plurality of plane surfaces, which are inscribed or circumscribed onto at least two arcs whose radiuses of curvatures are different relative to each other.

(9) The light-collecting device of item 8, wherein the photo-detector is disposed at each of both end portions of the reflector, and a cross-sectional area of the reflector at a center portion perpendicular to a longitudinal direction of the reflector is smaller than that at each of the end portions.

(10) The light-collecting device of item 8, wherein the photo-detector is disposed at an end portion of the reflector, and a cross-sectional area perpendicular to a longitudinal direction of the reflector decreases, as the cross-sectional area shifts towards another end portion of the reflector, at which the photo-detector is not disposed, from the end portion of the reflector, at which the photo-detector is disposed.

(11) The light-collecting device of item 8, wherein the photo-detector is disposed at a side surface of a center portion of the reflector, and a cross-sectional area of the reflector at the center portion perpendicular to a longitudinal direction of the reflector is larger than that at each of both end portions of the reflector.

(12) The light-collecting device of item 8, wherein the reflector comprises a glossy metal and/or a multi-layer coating.

(13) The light-collecting device of item 8, wherein the reflector has a wavelength selectivity.

(14) The light-collecting device of item 8, wherein an end-reflecting member is attached to an end of the reflector, at which the photo-detector is not disposed.

(15) The light-collecting device of item 14, wherein the end-reflecting member comprises a glossy metal and/or a multilayer coating.

(16) The light-collecting device of item 14, wherein the end-reflecting member has a wavelength selectivity.

(17) The light-collecting device of item 8, wherein an optical filter, having a wavelength selectivity, is disposed at a light-receiving surface of the photo-detector, and/or in the vicinity of the light-incoming aperture.

(18) A light-collecting device, comprising: a reflector, having a light-incoming aperture and shaped like a longish cylinder, a surface of which is a light-reflecting surface finished as a mirror surface; and a photo-detector to detect light residing inside the reflector; wherein a shape of the light-reflecting surface and a position of the light-incoming aperture are established so that a light entered from the light-incoming aperture is repeatedly reflected by the light-reflecting surface so as to rotate in a constant direction in the reflector, viewed from a direction perpendicular to a longitudinal direction of the reflector.

(19) The light-collecting device of item 18, wherein a perpendicular line at the light-incoming aperture is shifted from a center line of a cross-section perpendicular to a longitudinal direction of the reflector.

(20) The light-collecting device of item 18, wherein the light-reflecting surface comprises at least two arc surfaces whose radiuses of curvatures are different relative to each other.

(21) The light-collecting device of item 18, wherein the light-reflecting surface comprises a plurality of plane surfaces, which are inscribed or circumscribed onto at least two arcs whose radiuses of curvatures are different relative to each other.

(22) The light-collecting device of item 18, wherein the light-incoming aperture guides the light inside the reflector, and an area of a cross-section perpendicular to a longitudinal direction of the reflector increases as the cross-section shifts towards an end section of the reflector, at which the photo-detector is disposed.

(23) A light-collecting device, comprising: a reflector, having a light-incoming aperture and shaped like a longish cylinder, a surface of which is a light-reflecting surface finished as a mirror surface; and a photo-detector to detect light residing inside the reflector; wherein the reflector is sufficiently long in its longitudinal direction, and a shape of the light-reflecting surface and a position of the light-incoming aperture are established so that, viewed from a direction perpendicular to a longitudinal direction of the reflector, after a light entered from the light-incoming aperture is repeatedly reflected by the light-reflecting surface so as to rotate in a constant direction in the reflector, the light is repeatedly reflected again by the light-reflecting surface so as to rotate in a direction reverse to the constant direction.

(24) The light-collecting device of item 23, wherein a perpendicular line at the light-incoming aperture is shifted from a center line of a cross-section perpendicular to a longitudinal direction of the reflector.

(25) The light-collecting device of item 23, wherein the light-reflecting surface comprises at least two arc surfaces whose radiuses of curvatures are different relative to each other.

(26) The light-collecting device of item 23, wherein the light-reflecting surface comprises a plurality of plane surfaces, which are inscribed or circumscribed onto at least two arcs whose radiuses of curvatures are different relative to each other.

(27) The light-collecting device of item 23, wherein the light-incoming aperture guides the light inside the reflector, and an area of a cross-section perpendicular to a longitudinal direction of the reflector increases as the cross-section shifts towards an end section of the reflector, at which the photo-detector is disposed.

(28) A light-collecting device, comprising: a reflector, shaped like a longish cylinder, a surface of which is a light-reflecting surface finished as a mirror surface, the reflector comprising a light-incoming aperture to guide light inside the reflector; a light-guiding member, shaped like a longish element and disposed at the light-incoming aperture, to guide the light in a direction shifted from a center line of a cross-section perpendicular to a longitudinal direction of the reflector; and a photo-detector to detect the light residing inside the reflector.

(29) The light-collecting device of item 28, wherein the light-guiding member includes a light-input opening and a light-output opening through which the light is guided inside the reflector, and the light-guiding member is formed in such a shape that a width of the light-output opening is shorter than that of the light-input opening in a longitudinal direction of the light-guiding member.

(30) The light-collecting device of item 28, wherein the light-guiding member includes a light-input opening and a light-output opening, through which the light is guided inside the reflector, and the light-guiding member is formed in such a shape that a thickness of the light-output opening is thinner than that of the light-input opening in a direction perpendicular to a longitudinal direction of the light-guiding member.

(31) The light-collecting device of item 28, wherein an antireflection coating is applied onto both/either an input-surface and/or an output-surface of the light-guiding member.

(32) The light-collecting device of item 28, wherein a perpendicular line at the light-incoming aperture is shifted from a center line of a cross-section perpendicular to a longitudinal direction of the reflector.

(33) The light-collecting device of item 28, wherein the light-reflecting surface comprises at least two arc surfaces whose radiuses of curvatures are different relative to each other.

(34) The light-collecting device of item 28, wherein the light-reflecting surface comprises a plurality of plane surfaces, which are inscribed or circumscribed onto at least two arcs whose radiuses of curvatures are different relative to each other.

(35) The light-collecting device of item 28, wherein an area of a cross-section perpendicular to a longitudinal direction of the reflector increases as the cross-section shifts towards an end section of the reflector, at which the photo-detector is disposed.

(36) An image information reading apparatus for reading image information recorded on a sheet by scanning a light-beam on the sheet and detecting light corresponding to the image information recorded on the sheet by means of a photo-detector, comprising: a light-collecting device cited in item 1.

(37) The image information reading apparatus of item 36, wherein the light is either illuminating light, transmitting light or reflecting light corresponding to the image information recorded on the sheet.

(38) An image information reading apparatus for reading image information recorded on a sheet by scanning a light-beam on the sheet and detecting light corresponding to the image information recorded on the sheet by means of a photo-detector, comprising: a light-collecting device cited in item 5.

(39) The image information reading apparatus of item 38, wherein the light is either illuminating light, transmitting light or reflecting light corresponding to the image information recorded on the sheet.

(40) An image information reading apparatus for reading image information recorded on a sheet by scanning a light-beam on the sheet and detecting light corresponding to the image information recorded on the sheet by means of a photo-detector, comprising: a light-collecting device cited in item 8.

(41) The image information reading apparatus of item 40, wherein the light is either illuminating light, transmitting light or reflecting light corresponding to the image information recorded on the sheet.

(42) An image information reading apparatus for reading image information recorded on a sheet by scanning a light-beam on the sheet and detecting light corresponding to the image information recorded on the sheet by means of a photo-detector, comprising: a light-collecting device cited in item 18.

(43) The image information reading apparatus of item 42, wherein the light is either illuminating light, transmitting light or reflecting light corresponding to the image information recorded on the sheet.

(44) An image information reading apparatus for reading image information recorded on a sheet by scanning a light-beam on the sheet and detecting light corresponding to the image information recorded on the sheet by means of a photo-detector, comprising: a light-collecting device cited in item 23.

(45) The image information reading apparatus of item 44, wherein the light is either illuminating light, transmitting light or reflecting light corresponding to the image information recorded on the sheet.

(46) An image information reading apparatus for reading image information recorded on a sheet by scanning a light-beam on the sheet and detecting light corresponding to the image information recorded on the sheet by means of a photo-detector, comprising: a light-collecting device cited in item 28.

(47) The image information reading apparatus of item 46, wherein the light is either illuminating light, transmitting light or reflecting light corresponding to the image information recorded on the sheet.

Further, to overcome the abovementioned problems, other light-collecting devices, embodied in the present invention, will be described as follow:

(48) A light-collecting device, characterized in that, in the light-collecting device, which comprises a longer reflecting member provided with a light-incoming aperture where the internal surface is a mirror surface-like light reflecting surface, and a photo-detector to detect light in said reflecting member, the shape of said light reflecting surface and the position of said light-incoming aperture are set so that reflection is repeated in such a way that the light coming from said light-incoming aperture is rotated on one direction, as viewed from the direction vertical to the longitudinal direction of said reflecting member.

The shape of said light reflecting surface and the position of said light-incoming aperture are set to ensure that reflection is repeated so that light coming through said light-incoming aperture will rotate in one direction, as viewed from the direction vertical to the longitudinal direction of said reflecting member. Thus, light does not leak from the light-incoming aperture while the light coming to the light-collecting device is rotating in one direction. This reduces the amount of light leaking from the light-incoming aperture before light reaches the photo-detector. The light containing image information can be sent to the photo-detector with high efficiency. Hence, the image information with excellent SN ratio can be obtained and image information reading time can be reduced.

(49) A light-collecting device, characterized in that, in the light-collecting device, which comprises a longer reflecting member provided with a light-incoming aperture where the internal surface is a mirror surface-like light reflecting surface, and a photo-detector to detect light in said reflecting member, said reflecting member is sufficiently long in the longitudinal direction, and the shape of said light reflecting surface and the position of said light-incoming aperture are set to ensure that reflection is repeated so that the light coming from said light-incoming aperture rotates in one direction, as viewed from the direction vertical to the longitudinal direction of said reflecting member and, after that, reflection is repeated so that said light rotates in the direction reverse to said direction.

Said reflecting member is sufficiently long in the longitudinal direction, and the shape of said light reflecting surface and the position of said light-incoming aperture are set to ensure that reflection is repeated so that the light coming from said light-incoming aperture rotates in one direction, as viewed from the direction vertical to the longitudinal direction of said reflecting member and, after that, reflection is repeated so that said light rotates in the direction reverse to said direction. Thus, light does not leak from the light-incoming aperture while the light entering the light-collecting device rotates in one direction.

Even if said light rotates in the direction reverse to one direction, light does not leak if light fails to enter the light-incoming aperture. This reduces the amount of light leaking from the light-incoming aperture before light reaches the photo-detector. The light containing image information can be sent to the photo-detector with high efficiency. Thus, the image information with excellent SN ratio can be obtained and image information reading time can be reduced.

If the reflecting member is sufficiently long in the longitudinal direction, reflection is repeated so that much light rotates in one direction. After that, reflection is repeated so that light rotates in the direction reverse to said direction. As the reflecting member is reduced in the longitudinal direction, there is a decrease in the amount of light which repeats reflection by rotating in the direction reverse to one direction, and an increase in the amount of light which repeats reflection by rotating in one direction. Namely, there is an increase in the amount of light reaching the end of the reflecting member in the longitudinal direction before repeating reflection by rotation in the direction reverse to one direction.

(50) The light-collecting system according to Item 48 or 49 characterized in that the perpendicular of said light-incoming aperture is misaligned with the center direction of the cross section of the surface vertical to the longitudinal direction of said light-collecting device.

The perpendicular of said light-incoming aperture is misaligned with the center of the cross section of the surface vertical to the longitudinal direction of said light-collecting device. This increases the number of reflections until the light coming from said light-incoming aperture leaks from the light-incoming aperture.

Thus, there is a decrease in the amount of light leaking from the light-incoming aperture before reaching the photo-detector. The light containing image information can be led to the photo-detector with high efficiency, thereby ensuring image information with excellent SN ratio, or reducing image information reading time.

(51) The light-collecting device according to any one of Items 48 to 50 characterized in that said reflecting member has a circular arc light reflecting surface having at least two curvature radiuses.

Said reflecting member has a circular arc light reflecting surface having at least two curvature radiuses. This allows reflection to be repeated so that much light rotates in one direction; then reflection is repeated so that light rotates in the direction reverse to said direction.

Thus, there is a decrease in the amount of light leaking from the light-incoming aperture before reaching the photo-detector. The light containing image information can be led to the photo-detector with high efficiency, thereby ensuring image information with excellent SN ratio, or reducing image information reading time.

(52) The light-collecting device according to any one of Items 1 to 3, characterized in that said reflecting member has a light reflecting surface comprising multiple plane surfaces inscribing or circumscribing a circular arc having at least two curvature radiuses.

Said reflecting member has a light reflecting surface comprising multiple plane surfaces inscribing or circumscribing a circular arc light reflecting surface having at least two curvature radiuses. This allows reflection to be repeated so that light rotates in one direction; then reflection is repeated so that light rotates in the direction reverse to said direction.

Thus, there is a decrease in the amount of light leaking from the light-incoming aperture before reaching the photo-detector. The light containing image information can be led to the photo-detector with high efficiency, thereby ensuring image information with excellent SN ratio, or reducing image information reading time.

(53) A light-collecting device, characterized in that, in the light-collecting device, which comprises a longer reflecting member provided with a light-incoming aperture where the internal surface is a mirror surface-like light reflecting surface, and a photo-detector to detect light in said reflecting member, on the cross section vertical to the longitudinal direction of said reflecting member, said reflecting member has a circular arc light reflecting surface having at least two curvature radiuses, or a light reflecting surface comprising multiple plane surfaces inscribing or circumscribing a circular arc having at least two curvature radiuses.

On the cross section vertical to the longitudinal direction of said reflecting member, said reflecting member has a circular arc light reflecting surface having at least two curvature radiuses, or a light reflecting surface comprising multiple plane surfaces inscribing or circumscribing a circular arc having at least two curvature radiuses. This allows reflection to be repeated so that light rotates in one direction; then reflection is repeated so that light rotates in the direction reverse to said direction. Thus, there is a decrease in the amount of light leaking from the light-incoming aperture before reaching the photo-detector. The light containing image information can be led to the photo-detector with high efficiency, thereby ensuring image information with excellent SN ratio, or reducing image information reading time.

(54) The light-collecting device according to any one of Items 48 to 53 characterized in that said photo-detector is installed on each end of said reflecting member, and the cross section of the surface vertical to the longitudinal direction of said reflecting member is smaller at the central portion than at the end.

Said photo-detector is installed on each end of said reflecting member, and the cross section of the surface vertical to the longitudinal direction of said reflecting member is smaller at the central portion than at the end. In other words, the diameter increases from the center of the reflecting member toward both ends. This configuration reduces the number of reflections within the reflecting member until the photo-detector is reached, and decreases attenuation due to reflection.

Further, the decreased number of reflections reduces the amount of light leaking from the light-incoming aperture, and increases light-collecting efficiency. Thus, the light containing image information can be sent to the photo-detector with high efficiency. Hence, the image information with excellent SN ratio can be obtained or image information reading time can be reduced.

Further, a photo-detector is installed on each end of the long reflecting member. This allows use of a small-sized low-cost photo-detector, instead of a costly, longer or larger-diameter photo-detector.

In addition, installation of a photo-detector on each end of the reflecting member reduces the length of a light path from the incoming position to the photo-detector. Thus, the light containing image information can be led to the photo-detector with high efficiency, thereby ensuring image information with excellent SN ratio, or reducing image information reading time.

(55) The light-collecting device according to any one of Items 48 to 54, characterized in that said reflecting member has either lustrous metal or multi-layer film.

Said reflecting member has either lustrous metal or multi-layer film. This ensures a high reflection rate and reduces light attenuation. Thus, the light containing image information can be led to the photo-detector with high efficiency, thereby ensuring image information with excellent SN ratio, or reducing image information reading time.

(56) The invention according to Item 9 provides a light-collecting device according to any one of Items 48 to 55 characterized in that said reflecting member has a wavelength selectivity. Said reflecting member having a wavelength selectivity reduces the reflection rate of light which becomes noise other than frequency of light including image information.

Further, it also eliminates the need of a filter having wavelength selectivity or permits the performances thereof to be reduced. Thus, the SN ratio of the light containing image information received by the detector can be improved, thereby ensuring image information with excellent SN ratio, or reducing image information reading time.

(57) The light-collecting device according to any one of Items 48 to 56, characterized in that said photo-detector is installed on one end of the reflecting member, and the cross section of the surface vertical to the longitudinal direction of said reflecting member is smaller as light goes from the end equipped with said photo-detector to the end without it.

The cross section of the surface vertical to the longitudinal direction of said reflecting member is smaller as light goes from the end equipped with said photo-detector to the end without it. In other words, the area of the cross section is reduced as light goes from the end of the reflecting member provided with said photo-detector toward the end without it. This configuration reduces the number of reflections within the reflecting member until the photo-detector is reached, and decreases attenuation due to reflection.

Further, the decreased number of reflections reduces the amount of light leaking from the light-incoming aperture, and increases light-collecting efficiency. Thus, the light containing image information can be sent to the photo-detector with high efficiency. Hence, the image information with excellent SN ratio can be obtained or image information reading time can be reduced.

Further, the photo-detector installed on the end of the reflecting member allows use of a small-sized low-cost photo-detector, instead of a costly, longer or larger-diameter photo-detector.

In addition, installation of the photo-detector on one end of the reflecting member reduces costs.

(58) The light-collecting system according to any one of Items 48 to 57, characterized in that said photo-detector is installed at the center on the side of said reflecting member, and the cross section of the surface vertical to the longitudinal direction of said reflecting member is greater at the central portion than at the end.

Said photo-detector is installed at the center on the side of said reflecting member, and the cross section of the surface vertical to the longitudinal direction of said reflecting member is greater at the central portion than at the end. This configuration reduces the number of reflections within the reflecting member until the photo-detector is reached, and decreases attenuation due to reflection.

Further, the decreased number of reflections reduces the amount of light leaking from the light-incoming aperture, and increases light-collecting efficiency.

Thus, the light containing image information can be sent to the photo-detector with high efficiency. Hence, the image information with excellent SN ratio can be obtained or image information reading time can be reduced.

Further, the photo-detector installed at the center on the side of said reflecting member allows use of a small-sized low-cost photo-detector, instead of a costly, longer or larger-diameter photo-detector.

(59) The light-collecting system according to any one of Items 48 to 58, characterized in that an end reflecting member is installed on one of two ends of said reflecting member where the photo-detector is not installed.

An end reflecting member is installed on one of two ends of said reflecting member where the photo-detector is not installed. This eliminates the amount of light leaking from the end of the light-collecting device. Thus, the light containing image information can be sent to the photo-detector with high efficiency. Hence, the image information with excellent SN ratio can be obtained or image information reading time can be reduced.

(60) The light-collecting system according to Item 59, characterized in that said end reflecting member has either lustrous metal or multi-layer film.

Said end reflecting member having either lustrous metal or multi-layer film ensures increased reflection rate and decreased light attenuation. Thus, the light containing image information can be sent to the photo-detector with high efficiency. Hence, the image information with excellent SN ratio can be obtained or image information reading time can be reduced.

(61) The light-collecting system according to Item 59 or 60 characterized in that said reflecting member has a wavelength selectivity. Said reflecting member having a wavelength selectivity reduces the reflection rate of light which becomes noise other than frequency of light including image information.

Further, it also eliminates the need of a filter having wavelength selectivity or permits the performances thereof to be reduced.

Thus, the SN ratio of the light containing image information received by the detector can be improved, thereby ensuring image information with excellent SN ratio, or reducing image information reading time.

(62) The light-collecting device according to any one of Items 48 to 61 characterized in that an optical filter having wavelength selectivity is installed either on the light receiving surface of said photo-detector or in the vicinity of said light-incoming aperture.

An optical filter having wavelength selectivity is installed either on the light receiving surface of said photo-detector or in the vicinity of said light-incoming aperture. This reduces the light which becomes noise other than frequency of light including image information.

Thus, the SN ratio of the light containing image information received by the detector can be improved, thereby ensuring image information with excellent SN ratio, or reducing image information reading time.

(63) A light-collecting system characterized by comprising a light-collecting device further comprising a longer reflecting member provided with a light-incoming aperture where the internal surface is a mirror surface-like light reflecting surface, and with at least one photo-detector, and a light guide member to lead light to the light-incoming aperture of said light-collecting device.

A light guide member installed to lead light to the light-incoming aperture of said light-collecting device increases the degree of freedom in the layout of the system, and allows flexible system configuration.

(64) The light-collecting system according to Items 63, characterized in that said light-collecting device is the one according to any one of Items 48 to 62.

Said light-collecting device being the one according to any one of Items 48 to 62 allows use of a small-sized low-cost photo-detector, instead of a costly, longer or larger-diameter photo-detector.

Further, the light containing image information can be sent to the photo-detector with high efficiency. Hence, the image information with excellent SN ratio can be obtained or image information reading time can be reduced.

(65) The light-collecting system according to Item 63 or 64, characterized in that the perpendicular of the ongoing surface of said light guide member is misaligned with the center of the cross section of the surface vertical to the longitudinal direction of said light-collecting device.

The perpendicular of the ongoing surface of said light guide member is misaligned with the center of the cross section of the surface vertical to the longitudinal direction of said light-collecting device. This increases the number of reflections until the light coming from light-incoming aperture of the reflecting member of the light-collecting device leaks from the light-incoming aperture.

Thus, there is a decrease in the amount of light leaking from the light-incoming aperture before reaching the photo-detector. The light containing image information can be led to the photo-detector with high efficiency, thereby ensuring image information with excellent SN ratio, or reducing image information reading time.

(66) The light-collecting system according to any one of Items 63 to 65, characterized in that said light guide member is designed to ensure that the width in the longitudinal direction is smaller at the ongoing aperture than at the light-incoming aperture.

Said light guide member is designed to ensure that the width in the longitudinal direction is smaller at the ongoing aperture than at the light-incoming aperture. This makes it possible to decrease the width of the longitudinal direction (horizontal scanning direction) of the light-incoming aperture of the light-collecting device. In other words, it is possible to reduce the length of the longitudinal direction of the light-collecting device and to reduce the system size, without deteriorating the picture quality.

(67) The light-collecting system according to any one of Items 63 to 66 characterized in that said light guide member is designed so that only the thickness in the direction vertical to the longitudinal direction is smaller at the ongoing aperture than at the light-incoming aperture. Said light guide member is designed so that only the thickness in the direction vertical to the longitudinal direction is smaller at the ongoing aperture than at the light-incoming aperture. This makes it possible to reduce the area of the light-incoming aperture in the reflecting member.

Thus, there is a decrease in the amount of light leaking from the light-incoming aperture, and the light containing image information can be led to the photo-detector with high efficiency, thereby ensuring image information with excellent SN ratio, or reducing image information reading time.

(68) The light-collecting system according to any one of Items 63 to 67 characterized in that reflection preventive coating is provided on either the incoming surface or ongoing surface of said light guide member.

Reflection preventive coating is provided on either the incoming surface or ongoing surface of said light guide member. This makes it possible to reduce the light reflection in either the incoming surface or ongoing surface of the light guide. Thus, the light containing image information can be led to the photo-detector with high efficiency.

This ensures image information with excellent SN ratio, or reduces image information reading time.

(69) An image information reading system, characterized in that, in the image information reading system, which performs light scanning on the sheet with image information recorded thereon, detects emission conforming to the image information of said sheet using a photo-detector, and reads the image information of said sheet, said image information reading system comprises a light-collecting device according to any one of Items 48 to 62.

Said light-collecting device is a light-collecting device according to any one of Items 48 to 62. This allows use of a small-sized low-cost photo-detector, instead of a costly, longer or larger-diameter photo-detector.

The light containing image information can be led to the photo-detector with high efficiency, thereby ensuring image information with excellent SN ratio, or reducing image information reading time.

(70) An image information reading system, characterized in that, in the image information reading system, which performs light scanning on the sheet with image information recorded thereon, detects emission conforming to the image information of said sheet using a photo-detector, and reads the image information of said sheet, said image information reading system comprises a light-collecting system according to any one of Items 63 to 68.

When the light-collecting system according to any one of Items 63 to 68 is provided, it is possible to increases the degree of freedom in the layout of the light-collecting device and allows flexible system configuration. It is also possible to use a small-sized low-cost photo-detector, instead of a costly, longer or larger-diameter photo-detector.

Further, the light containing image information can be sent to the photo-detector with high efficiency. Hence, the image information with excellent SN ratio can be obtained or image information reading time can be reduced.

(71) An image information reading system, characterized in that, in the image information reading system which performs scanning of light on the sheet with image information recorded thereon, detects either the transmitted light or reflected light conforming to the image information of said sheet using a photo-detector, and reads the image information of said sheet, said image information reading system comprises a light-collecting device according to any one of Items 48 to 62.

Said light-collecting device is the one according to any one of Items 48 to 62. This allows use of a small-sized low-cost photo-detector, instead of a costly, longer or larger-diameter photo-detector.

Further, the light containing image information can be sent to the photo-detector with high efficiency. Hence, the image information with excellent SN ratio can be obtained or image information reading time can be reduced.

(72) An image information reading system, characterized in that, in the image information reading system which performs scanning of light on the sheet with image information recorded thereon, detects either the transmitted light or reflected light conforming to the image information of said sheet using a photo-detector, and reads the image information of said sheet, said image information reading system comprises a light-collecting system according to any one of Items 63 to 68.

When the light-collecting system according to any one of Items 63 to 68 is provided, it is possible to increases the degree of freedom in the layout of the light-collecting device and allows flexible system configuration.

It is also possible to use a small-sized low-cost photo-detector, instead of a costly, longer or larger-diameter photo-detector.

Further, the light containing image information can be sent to the photo-detector with high efficiency. Hence, the image information with excellent SN ratio can be obtained or image information reading time can be reduced.

BRIEF DESCRIPTION OF THE DRAWING

Other objects and advantages of the present invention will become apparent upon reading the following detailed description and upon reference to the drawings in which:

FIG. 8 is a drawing illustrating still another embodiment;

FIG. 9 is a drawing illustrating a further embodiment;

DETAILED DESCRIPTION OF THE PREFERRED EMBODIMENT (1) First Embodiment

Figure 1:
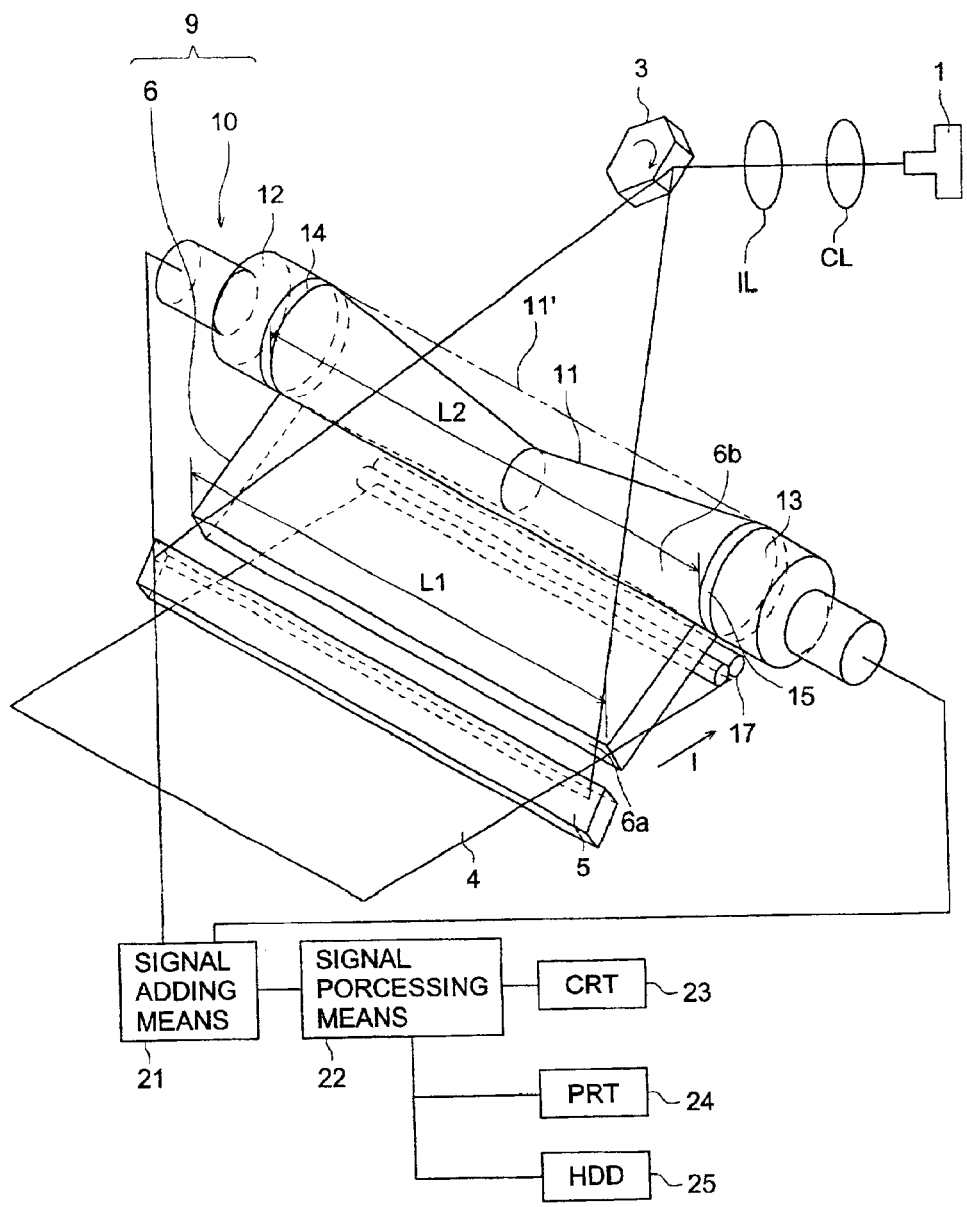
FIG. 1 is a general configuration drawing of a first embodiment.

The following describes the general configuration of the image reading system as the first embodiment with reference to FIG. 1:

In the drawing, laser beam (stimulating lays) coming out of the laser diode 1 passes through a collimator lens CL and imaging lens IL and is scanned by a polygon mirror 3 to perform (horizontal) scanning on a photo stimulable storage phosphor sheet 4 at a specified beam diameter.

When beam applies to the photo stimulable storage phosphor sheet 4 fed in the direction of arrow 1, there occurs light emitted by the stimulable phosphor in conformity to image information recorded on the photo stimulable storage phosphor sheet 4. Part of this light emitted by the stimulable phosphor (hereinafter referred to as "light") is reflected by a reflection optical member 5 provided with reflection enhancing coating as a reflection optical member, and part of it directly enters the incoming end face 6a of the light-collecting system 9 comprising a light-collecting device 10 and a light guide plate 6 as a guide member to lead light to the light-collecting device 10.

The light guide plate 6 is designed so that the width of the cross section in the direction of leading light is gradually smaller. Namely, it is designed to have a taper structure such that the length in the horizontal scanning direction (L2) in the ongoing end face 6b on the side of light-collecting device 10 is smaller than length (L1) in the direction of horizontal scanning in the incoming end face 6a on the side of the photo stimulable storage phosphor sheet 4. In this embodiment, the taper angle is designed so that almost all reflections can be maintained. For example, when the refractive index of light guide plate 6 is 1.5, no light leaking from the light guide plate 6 so long as taper angle is about 60. The length of light-collecting device 10 can be reduced without reducing the reading width. Further, the taper angle can be increased to reduce the light-collecting efficiency to some extent. Further, the size of the longer direction of the light-collecting device 10 can be more reduced. This allows the light-collecting system 9 to be designed in a small configuration.

Light reflected by the reflection optical member 5 enters the end face 6a on the side of the photo stimulable storage phosphor sheet 4 of the light guide plate 6 made of polymethyl methacrylate (PMMA) and other materials having a high degree of transmittance as a guide member. Light having entered the light guide plate 6 goes out of the ongoing end face 6b on the side of the light-collecting device 10 as it is reflected inside the light guide plate 6. Then it enters the light-collecting device 10.

The light-collecting device 10 comprises (1) a longer reflecting member 11 where the inner surface is a mirror surface-like light reflecting surface and (2) photomultipliers 12 and 13 as photo-detectors for photoelectric conversion of the incoming light installed on both ends of said reflecting member 11.

In the present embodiment, the filters 14 and 15 are provided to attenuate the wavelength range of the laser beam (stimulating lays) as to contact the light receiving surface of the photomultiplier 13. In place of filters 14 and 15, filters can be installed between the incoming surface of the light guide plate 6 and photo stimulable storage phosphor sheet 4, or between the light guide plate 6 and light-collecting device 10.

Signals subjected to photoelectric conversion by the photomultipliers 12 and 13 are added by signal adding means 21, and are processed by signal processing means 22. Then they are displayed on the CRT23, printed out by the printer 24 or recorded on an external recording system such as hard disk.

High voltage supplied to the photomultipliers 12 and 13 is regulated so that signals subjected to photoelectric conversion by the photomultipliers 12 and 13 will be on almost the same level. Further, the signal adding means 21 can be based on either analog or digital principle.

An erasing lamp 15 is provided on the downstream side of the light guide plate 6 to erase the image information recorded on the photo stimulable storage phosphor sheet 4. The image information remaining inside the photo stimulable storage phosphor sheet 4 where After reading of image information has been completed is erased by the erasing lamp 17.

Figure 2:
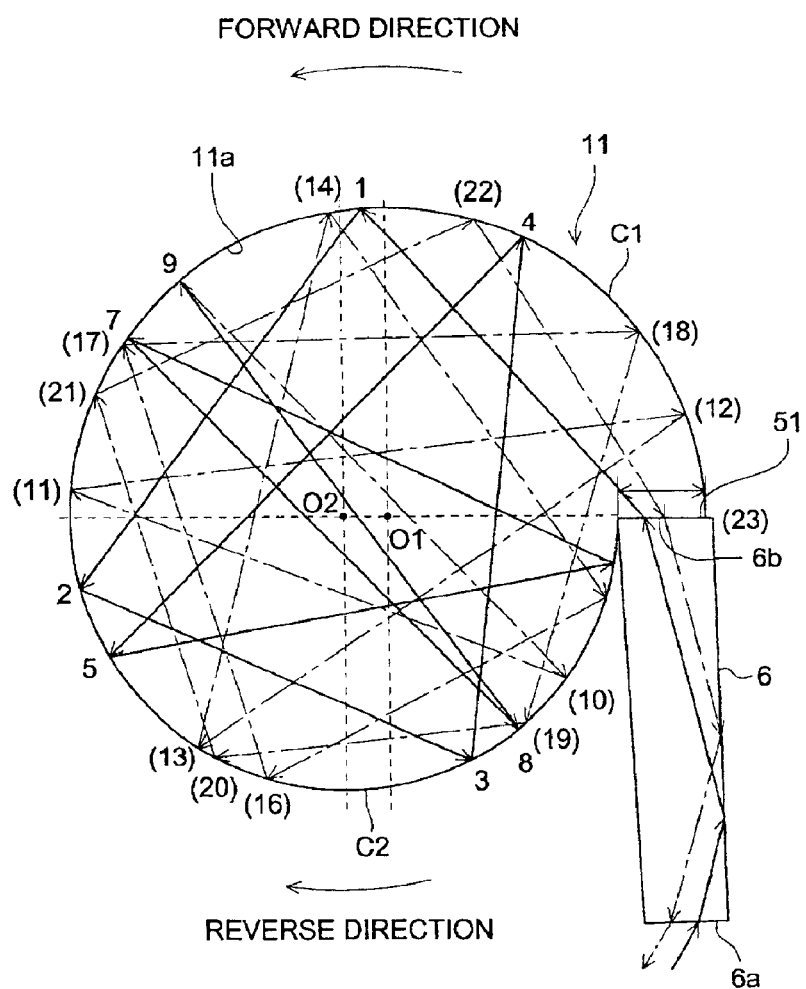
FIG. 2 is a drawing representing the cross section vertical to the longitudinal direction of the reflecting member in FIG. 1, wherein the reflecting surface is shown without the peripheral portion.
Figure 3:
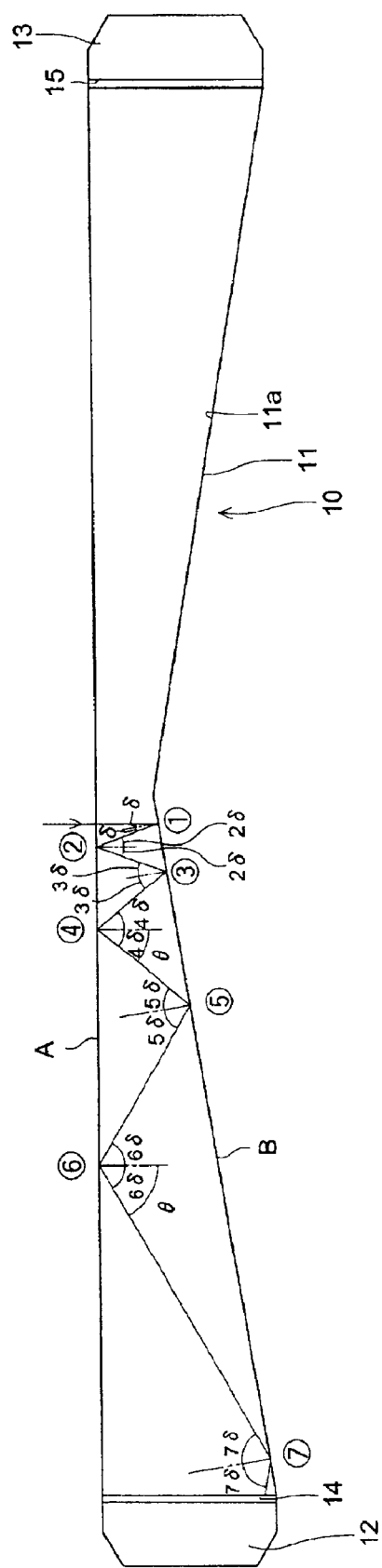
FIG. 3 is a drawing representing the cross section in the longitudinal direction of the reflecting member in FIG. 1, wherein the reflecting surface is shown without the peripheral portion.

The following describes the light-collecting device 10 using FIG. 2 representing the cross section vertical to the longitudinal direction of the reflecting member in FIG. 1, wherein the reflecting surface is shown without the peripheral portion, and FIG. 3 representing the cross section in the longitudinal direction of the reflecting member in FIG. 1, wherein the reflecting surface is shown without the peripheral portion.

For simplicity, FIG. 2 shows the reflection of light on the cross section vertical to longitudinal direction in a cylindrical reflecting member without taper in the longitudinal direction (shown by imaginary two-dot chain liner in FIG. 1) 11'.

As shown in FIG. 2, the reflecting member 11 has a light-incoming aperture 51 which is extended in the longitudinal direction for entry of light and which is connected with the ongoing end face 6b of the light guide plate 6.

In the present embodiment, the perpendicular on the end face 6b as the ongoing surface of the light guide plate 6 is misaligned with the central direction of the cross section (cross section vertical to the longitudinal direction), as viewed from the longitudinal direction of the reflecting member 11.

In the cross section vertical to longitudinal direction of the reflecting member 11, the light reflecting surface 11a inside the reflecting member 11 is designed in a structure comprising a combination of arcs of two circle C1 and C2 having different curvature radiuses. Centers 01 and 02 of each semicircle are misaligned.

A shown in FIG. 3, taper with an angle of γ is provided in the longitudinal direction of the reflecting member 11. The area of the cross section of the reflecting member 11 is smaller at the center side than at the end where photomultipliers 12 and 13 are laid out.

Light having entered the reflecting member 11 is attenuated in conformity to reflection rate on the reflecting surface for each reflection in the light reflecting surface 11a. So the reflection rate of the light reflecting surface 11a is preferred to be higher.

The light reflecting surface 11a according to the present embodiment is composes of a combination between lustrous metal (deposited aluminum according to the present embodiment) and multi-layer coating. The reflection rate is 95% or more.

The multi-layer coating according to the present embodiment is designed in a 6-layered structure where $TiO_2$ and NaF are overlapped alternately. However, the material is not restricted to the above-mentioned material. To increase reflection rate, it is preferred to be made up of materials where the difference in refractive index is as big as possible.

In addition, the light reflecting surface 11a can be made of only multi-layer coating (20-0 or more layer) where $TiO_2$ and $SiO_2$ are alternately overlapped, or a combination of two types or more which are alternately overlapped. There are many way of designing the multi-layer coating to ensure the required spectral reflection rate.

The coating thickness of each layer is preferred to have the wavelength equivalent to about one-fourth of light to be reflected. Film formation is not restricted; namely, the coating thickness on each layer need not be almost the same.

To minimize the absorption, it is necessary to select the material of the multi-layer coating, which has a high transmittance in the wavelength range of signal light. The following describes how light proceeds in the reflecting member 11:

<1>How light proceeds in the cross section vertical to longitudinal direction in the reflecting member 11

Figure 4:
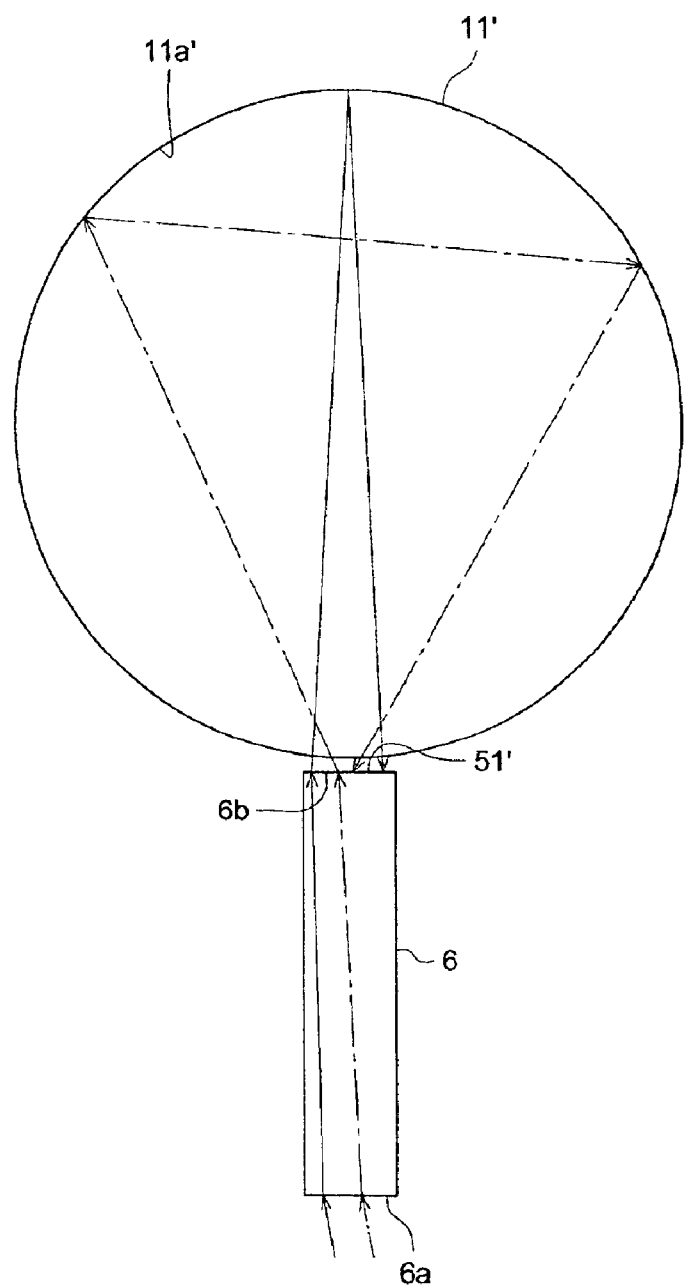
FIG. 4 is a drawing representing the Reference Example in FIG. 2.

The following description will be given with reference to FIG. 2 according to the present embodiment and FIG. 4 as a Reference Example of FIG. 2: FIG. 4 represents the reflecting surface without peripheral surface.

FIG. 4 shows an example where the perpendicular on the ongoing end face 6b as an ongoing surface of the light guide plate 6 is directed toward the center of the cross section (the cross section vertical to longitudinal direction) as viewed from the longitudinal direction of the reflecting member 11'. Further, the cross section is circular in the longitudinal direction of the reflection member 11'.

In this configuration, the number of reflections is very small (for example, one, two or three reflections). There is light leaking from the light-incoming aperture 51'. According to the present embodiment as shown in FIG. 2, by contrast, the light entering the light-incoming aperture 51 of the reflecting member 11 rotates in one direction (counterclockwise direction in FIG. 2. The rotational direction of reflected light immediately after entry into the light-collecting device is hereinafter referred to as "forward direction"). Reflection is repeated during said rotation.

When reflected light has passed between centers 01 and 02 of two semicircles, reflection is repeated in the direction reverse to said one direction (clockwise direction in FIG. 2. The direction reverse to said forward direction is hereinafter referred to as "reverse direction"). Then light goes out of the light-incoming aperture 51.

In FIG. 2, reflection of light was explained, for simplicity, in the cross section vertical to longitudinal direction when the taperless cylindrical reflecting member 11' in the longitudinal direction was used. The similar action takes place on the tapered reflecting member 11. (Let us assume here that N refers to the number of rotations from the time when light enters the light-incoming aperture 51 to the time when it goes out of the light-incoming aperture 51). While the light having entered the light-collecting device 10 is rotating in the forward direction inside the reflecting member 11, light does not leak from the light-incoming aperture 51 [because the light-incoming aperture 51 faces upward]. Despite rotation in the reverse direction, light does not leak if it is out of the light-incoming aperture 51. Hence, the amount of light leaking from the incoming opening 51 is reduced if light reaches the photomultiplier 12 during reflection inside the reflection member 11.

<2>How light proceeds in the cross section vertical to longitudinal direction in the reflecting member 11

Figure 5:
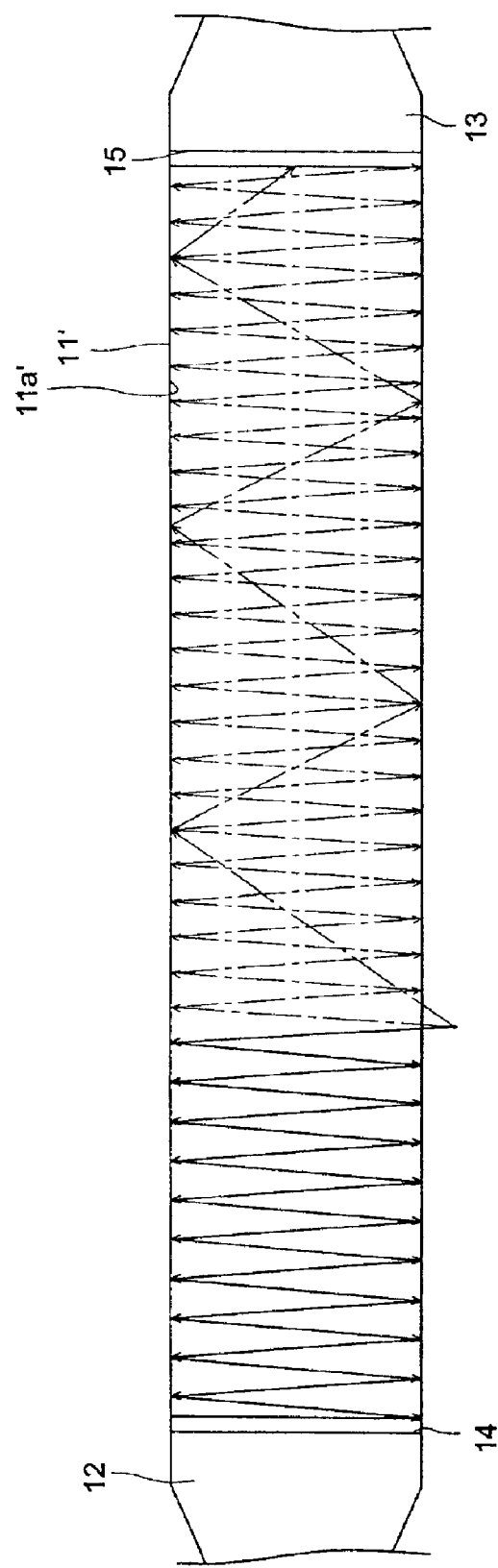
FIG. 5 is a drawing representing the Reference Example in FIG. 3.

The following description will be given with reference to FIG. 3 according to the present embodiment and FIG. 5 as a Reference Example: FIG. 5 represents the reflecting surface without peripheral surface.

FIG. 5 shows a cylindrical reflecting member where the cross section is almost constant. In this configuration, if light enters approximately vertically with respect to light reflected surface 11a', a considerable number of reflections must take place until light reaches the light receiving surface of the photomultipliers 12 and 13.

According to the present embodiment, by constant, the light reflecting surface 11a of the reflecting member 11 is tapered at an angle of γ in the longitudinal direction. Hence, even if light enters vertically to the surface A, reflection is carried out as follows:

$$\theta = \gamma \times n \text{ (}n\text{: number of reflections)}$$

where the angle between the perpendicular of surface A and light reflected on surface A is θ. Thus, light reaches the photomultipliers 12 and 13 at a small number of reflections.

The above explanation was made with respect to the light on the surface where the center of the reflecting member 11 was vertically divided in the longitudinal direction. Light entering the reflecting surface at a different angle is also subjected to the same action by the angle of taper at the point of reflection, although there is a difference in degree.

Hence, taper is provided in the longitudinal direction so that the cross section of the reflecting member 11 is smaller at the central portion than at the end where photomultipliers 12 and 13 are laid out. This ensures incoming light reaches photomultipliers 12 and 13 at a smaller number of reflection.

Light having entered the reflecting member 11 of the light-collecting device 10 is attenuated for each reflection according to the reflection rate of the light reflecting surface 11a. So the reflection rate on the reflected surface is preferred to be as high as possible. Further, the greater the diameter of the light-collecting device, the smaller the number of reflections. So when it is greater, light-collecting efficiency is improved.

Thus, the area of the photoelectric surface of the photomultiplier is preferred to be greater. The greater the above-mentioned taper angle, the smaller the number of reflections until light reaches the light receiving surface of the photomultipliers 12 and 13.

If the inner diameter of the light reflecting surface 11a is not sufficiently great with respect to the width of the light-incoming aperture 51 (indicated by W in FIG. 2), the amount of light leaking from the light-incoming aperture 51 will be increased. The inner diameter of the light reflecting surface 11a, width of the light-incoming aperture 51 (W) and taper angle (γ) are determined so that the amount of light reaching the photoelectric surface of the photomultipliers 12 and 13 will be the maximum. The above configuration provides the following effects:

<1>If photomultipliers 12 and 13 are provided on the end face of the longer reflection member 11 of the light-collecting device 11, there is no problem. A small-sized low-cost image reading system, light-collecting system and light-collecting device can be provided, without using a large light-collecting equipment of complicated configuration or high-priced longer photomultiplier (photodetector).

<2>The perpendicular on the end face 6b as an ongoing surface of the light guide plate 6 is misaligned with the center direction of the cross section (the cross section vertical to longitudinal direction) as viewed from the longitudinal direction of the reflecting member 11. The light reflecting surface 11a as an inner surface of the reflecting member 11 on the cross section vertical to longitudinal direction of the reflecting member 11 is designed in a structure comprising a combination of arcs of two circle C1 and C2 having different curvature radiuses. As a result, light can be controlled so that reflection takes place only in the forward direction in the beginning. This reduces the amount of light leaking from the light-incoming aperture 51 before light reaches the photomultipliers 12 and 13. The light containing image information can be sent to the photomultipliers 12 and 13 with high efficiency. Hence, the image information with excellent SN ratio can be obtained and image information reading time can be reduced.

Taper is provided in the longitudinal direction so that the area of the cross section of the reflection member 11 is smaller at the center side than at the end where photomultipliers 12 and 13 are laid out. This reduces the number of reflections inside the reflecting member 11 until light reaches photomultipliers 12 and 13. It also reduces attenuation by reflection.

Further, if the number of reflections is reduced, the amount of light leaking from the light-incoming aperture 51 is also reduced with the result that light-collecting efficiency is improved. Thus, the light containing image information can be sent to the photo-detector with high efficiency. Hence, the image information with excellent SN ratio can be obtained and image information reading time can be reduced.

<3> A light guide plate (light guide member) 6 is installed to lead light to the light-incoming aperture 51 of the reflecting member 11 of the light-collecting device 10. This ensures the following:

(1) Light is led to the light-collecting device 10 more effectively than in the absence of light guide plate 6.

Figure 6:
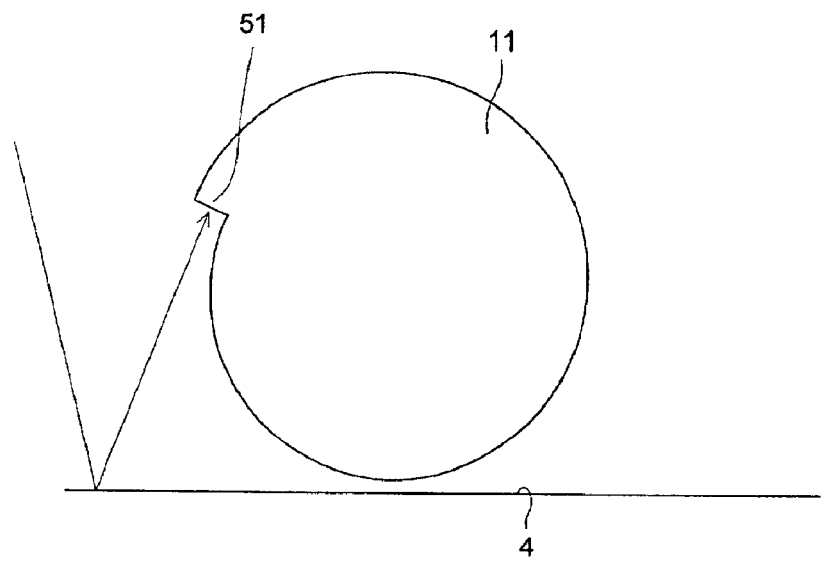
FIG. 6 is a drawing illustrating the effect of the first embodiment.
Figure 6:
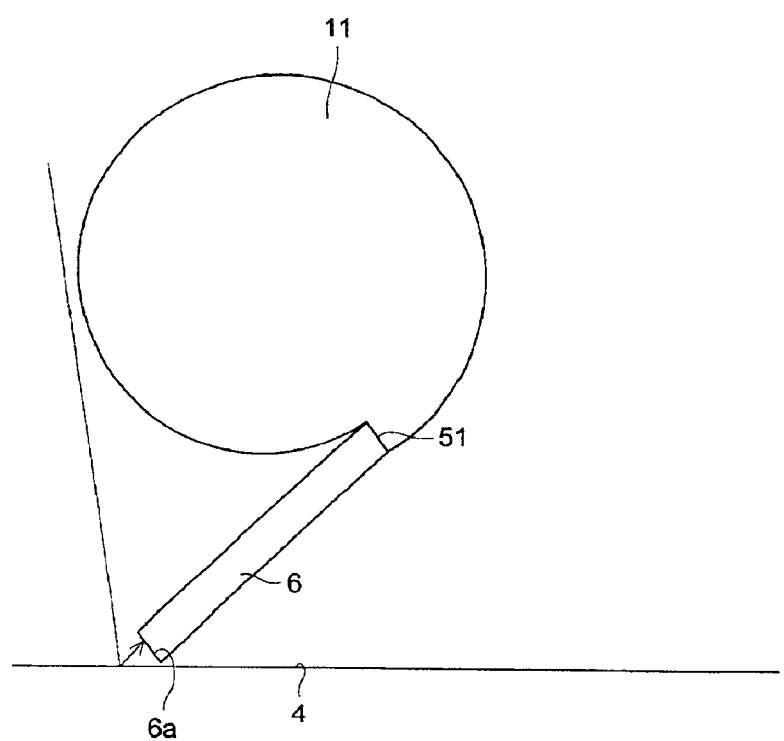

In other words, the light reflected by the photo stimulable storage phosphor sheet 4 is scattered light, as shown in FIG. 6(a). When there is no light guide plate 6, there will be greater distance between the light-incoming aperture 51 of the light-collecting device 10 and photo stimulable storage phosphor sheet 4. So a greater amount of light fails to reach the light-incoming aperture 51 of the light-collecting device 10.

According to the present embodiment as shown in FIG. 6(b), a light guide plate 6 is installed, and the end face 6a of the light guide plate 6 is laid out close to the photo stimulable storage phosphor sheet 4. As a result, the most of light reflected by the photo stimulable storage phosphor sheet 4 enters the light guide plate 6. Thus, light can be led effectively to the light-collecting device 10.

(2) As shown in FIG. 6(b), laser beam can be applied to the photo stimulable storage phosphor sheet 4 approximately vertically. This makes the picture quality of the read image immune to the mechanical vibration.

(3) The light-collecting device 10 can be arranged close to the photo stimulable storage phosphor sheet 4, ensuring a flexible configuration of the image reading system. In other words, it is necessary to provide an erasing lamp 17 to erase the information remaining on the photo stimulable storage phosphor sheet after reading in a radiation image reading system using the photo stimulable storage phosphor sheet having said configuration. However, if a light guide plate 6 is provided and the length of the light guide plate 6 is changed, the distance the photo stimulable storage phosphor sheet 4 and light-collecting device 10 can be set to any desired value. Hence, the erasing lamp can be arranged close to the fluorophore sheet 4, ensuring a flexible layout inside the system. Further, the light guide plate 6 can be bent within the range where a full reflection can be maintained, and flexible layout inside the system can be guaranteed.

<4> Photomultipliers 12 and 13 are provided on both ends of the reflecting member 11. The length of the optical path from the light entry position inside the reflection member 11 to the photomultipliers 12 and 13 is made smaller than that when only one photomultiplier is installed. Thus, the light containing image information can be sent to the photo-detector with high efficiency. Hence, the image information with excellent SN ratio can be obtained and image information reading time can be reduced.

<5> Filters 14 and 15 are installed close to the light receiving surface of the photomultipliers 12 and 13.

When used in the radiation image reading system using a photo stimulable storage phosphor sheet, a smaller amount of the stimulating lays having different wavelength from that of the light, emitted by the stimulable phosphor, will enter the photomultipliers 12 and 13. Hence, the image information with excellent SN ratio can be obtained and image information reading time can be reduced.

<6> Generally, the quantum efficiency on the photoelectric surface of the long photomultiplier is lower than that on the photoelectric surface of other small-sized photomultiplier. Hence, light-collecting efficiency including the quantum efficiency on the photoelectric surface of the long photomultiplier is higher in the configuration according to the present embodiment. So the present embodiment is superior in the SN ratio of the image and costs. There is no need of using a large-sized light guide. System size can be made smaller.

<7> The light guide plate 6 is designed in a tapered structure to ensure that length (L2) in the horizontal scanning direction at the end face 6b on the side of the light-collecting device 10 is smaller than the length (L1) in horizontal scanning direction at the end face 6a on the side of the photo stimulable storage phosphor sheet 4. The length of the light-collecting tube in the horizontal scanning direction can be reduced without deteriorating the picture quality, and the system size can be decreased. Further, if light-collecting efficiency can be reduced so some extent by increasing the taper angle, then the size of the light-collecting device 10 in the longer direction can be further reduced, and the light-collecting system 10 can be made in smaller size.

Figure 7:
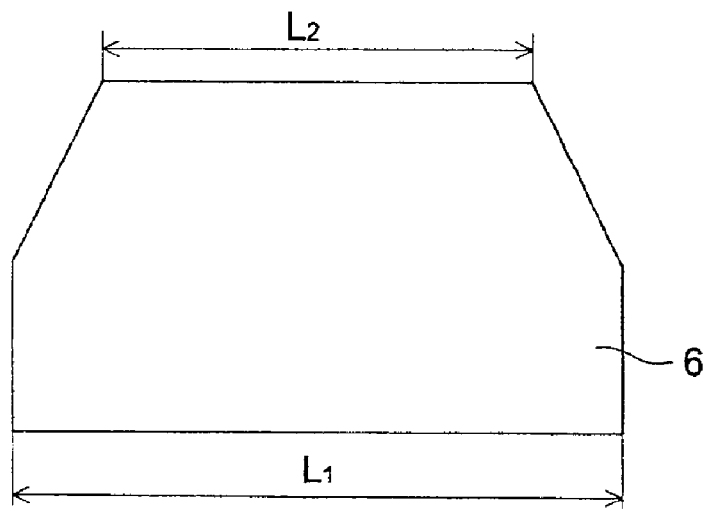
FIG. 7 is a drawing illustrating another embodiment.
Figure 7:
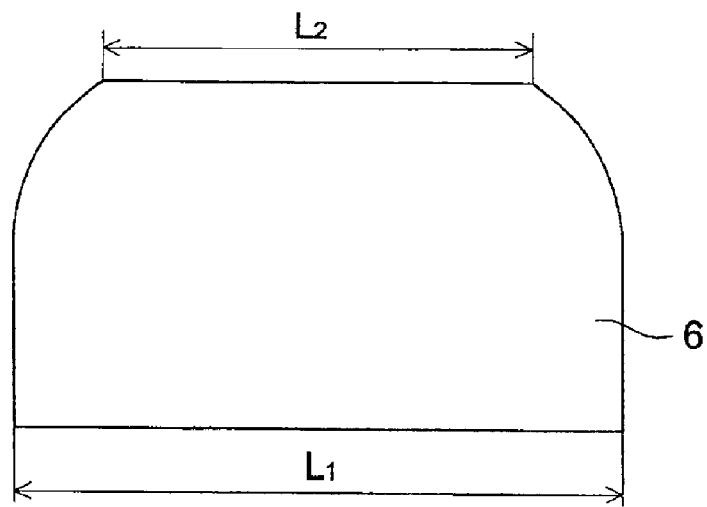

If L1>L2, there is no need of providing a taper over the entire range. Taper can be provided partially as shown in FIG. 7(a), for example. A curved taper may be provided as shown in FIG. 7(b).

<8> The average distance from the light entry position to the light receiving surface of the photomultiplier is small, because of the reflecting member 311 of the configuration shown in FIG. 14 to be discussed later. Taper angle can be made larger than that shown in FIG. 14. Therefore, light-collecting efficiency is better than that of the type shown in FIG. 14. Depending on conditions, it is possible to eliminate almost completely the light leaking from the aperture of the light-collecting device. The light-collecting loss in this case is approximately restricted to the loss due to reflection rate on the reflecting surface.

In this case, the end face 6b from which light of the light guide plate 6 comes out is preferred to be configured so that there is no clearance between it and the light-incoming aperture 51 of the reflecting member 11.

The present invention is not restricted to above embodiments. It also allows the following variations:

(1) The light reflecting surface 11a of the reflecting member 11 of the light-collecting device 10 need not have a circular arc with at least two curvature radiuses. It may be a light reflecting surface comprising multiple plane surfaces inscribing (see FIG. 8(a)) or circumscribing (see FIG. 8(b)) a circular arc having at least two curvature radiuses.

(2) The reflecting member 11 of the light-collecting device 10 can be a hollow cylinder where its inner surface is used as a reflecting surface. Or it can be a rod which comprises an approximately transparent non-hollow substance where light passes through, wherein the outer surface of said rod is used as a light reflecting surface 11a.

(3) The area of the cross section of the reflecting member 11 is smaller at the center side than at the end where photomultipliers 12 and 13 are laid out. Not only a straight taper but also a stepwise form or curve can be used. Any shape is acceptable if there is a gradual reduction in the area of the cross section.

(4) The light reflecting surface 11a may not be composed of a combination between deposited aluminum and multi-layer film. It may consists of only the multi-layer film alone. For example, lustrous aluminum may be used, or a lustrous combination of aluminum and multi-layer film may be utilized. Any such material can bee used if reflection rate is sufficiently high in the wavelength area of the incoming light and it has a plane surface without much scattering of light.

(5) To reduce the number of reflections, the taper angle of the light-collecting device should be large enough to allow accommodation in the light receiving surface of the photomultiplier.

(6) It goes without saying that, in the light reflecting surface 11a of the reflecting member 11, the direction in which light reflection may be either forward or reverse.

(7) The light-collecting system 9 and light-collecting device 10 can be used not only in the reading system to read radiation image information from the photo stimulable storage phosphor, but also in the device to read the transmitted or reflected light in conformity to image information of the sheet, namely, in the system including the optical detecting means required to provide high SN ratio or high reading speed, such as an X-ray film scanner, printing plate scanner, surface inspection equipment and light-collecting device.

(8) Filters 14 and 15 are installed close to the light receiving surface of the photomultipliers 12 and 13 in the present embodiment. However, the filters can be installed on the end face 6a or 6b of the light guide plate 6. In this case, to reduce loss of reflection on the end face 6a or 6b, the filter and light guide plate are preferred to be bonded together optically using a bonding agent with almost the same refractive index.

(9) The reflecting surface 11a of the reflecting member 11 need not have a circular cross section. The cross section can have a polygonal shape comprising a combination plane surfaces.

(10) The reflecting member 11 can be provided with wavelength selectivity to permit attenuation of the stimulating lays and to allow a high degree of reflection of light emitted by the stimulable phosphor.

(11) The light guide plate 6 is designed in such a way that the width of the cross section in the direction where light is led is gradually smaller as light comes closer to the light-incoming aperture 51. As shown in FIG. 9, taper angle (δ) can be provided in the direction of thickness of the cross section in the direction where light is led, and can be made gradually smaller as light comes closer to the light-incoming aperture 51. It should be noted that FIG. 9 shows the reflecting surface without the peripheral surface, similarly to FIGS. 2 and 4.

Such a configuration reduces the area of the light-incoming aperture 51 inside the reflecting member 11. This reduces the amount of light leaking from the light-incoming aperture 51. Thus, the light containing image information can be sent to the photo-detector with high efficiency. Hence, the image information with excellent SN ratio can be obtained or image information reading time can be reduced.

Figure 10:
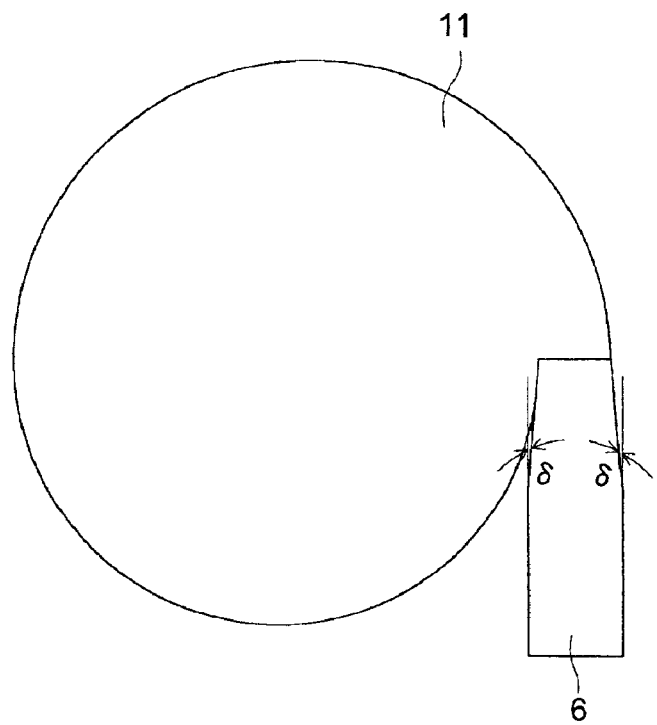
FIG. 10 is a drawing illustrating a still further embodiment.
Figure 10:
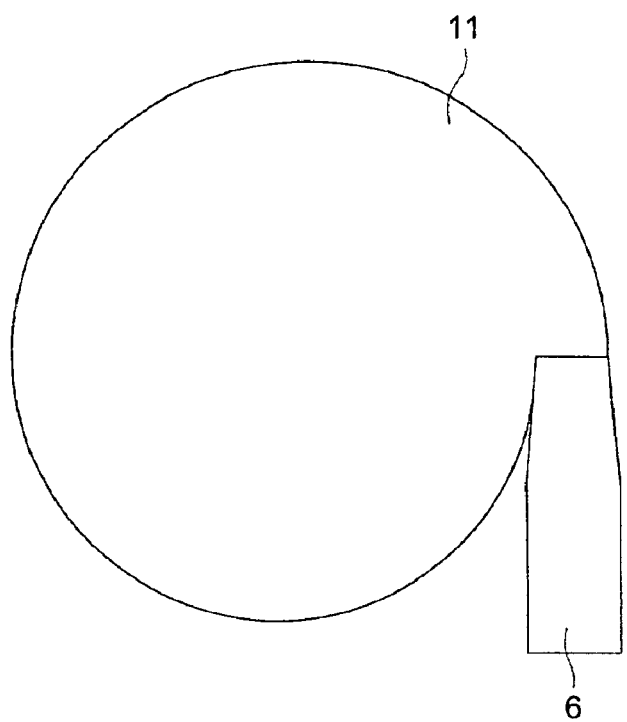

In FIG. 9, taper angle (δ) is provided over the entire range in the direction of thickness of the cross section in the direction where light is led, and is made gradually smaller as light comes closer to the light-incoming aperture 51. As shown in FIG. 10(a), taper can be provided only partially.

A curved taper can also be provided as shown in FIG. 10(b).

(2) Second Embodiment

Figure 11:
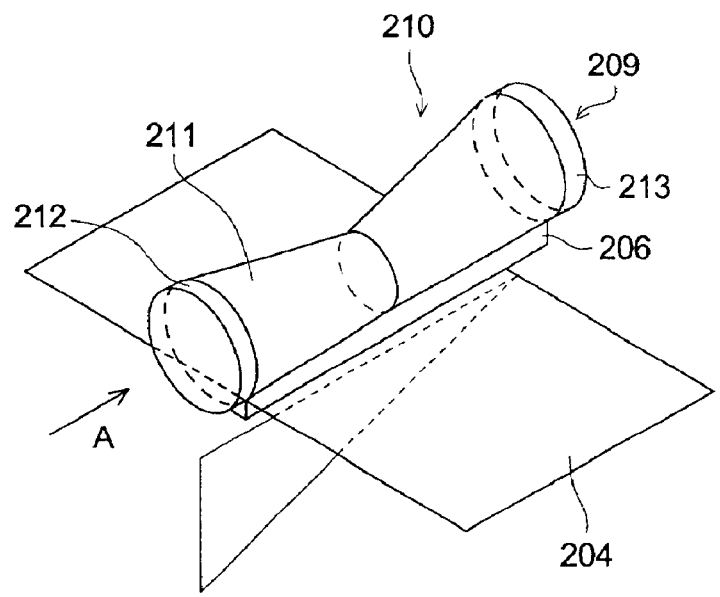
FIG. 11 is a drawing illustrating a second embodiment.
Figure 12:
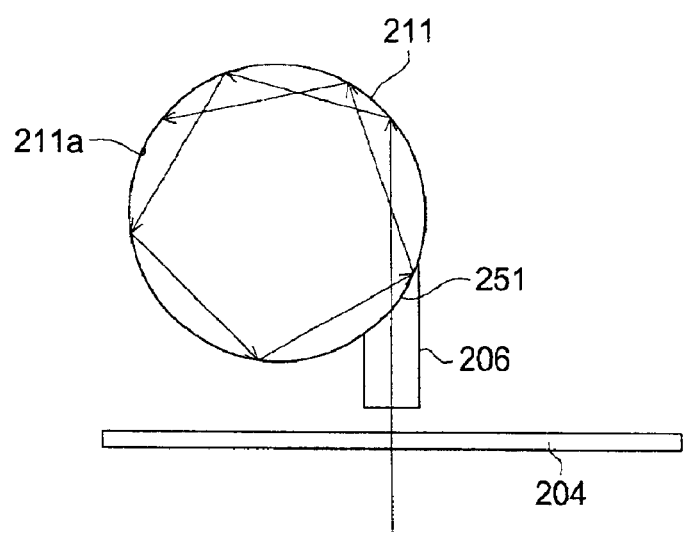
FIG. 12 is a drawing representing the cross section as viewed from direction A in FIG. 11 wherein the reflecting surface is shown without the peripheral portion.

The following describes the Second Embodiment with reference to FIG. 11 as a configuration diagram to describe the second embodiment and FIG. 12 representing the cross section viewed from the direction A in FIG. 11, as a drawing to show the reflecting surface without peripheral portion. The present embodiment also relates to the system to read image information recorded on the photo stimulable storage phosphor sheet.

In these figures, the laser beam starting from a laser diode (not illustrated) is scanned by a polygon mirror (not illustrated), and is subjected to horizontal scanning on the photo stimulable storage phosphor sheet 204.

Then light emitted by the stimulable phosphor in conformity to image information recorded on the photo stimulable storage phosphor sheet 204 is produced from both sides (surface and back) of the photo stimulable storage phosphor sheet 204. Light emitted by the stimulable phosphor (hereinafter referred to as "light") on the back side which is the opposite of the side where laser beam was present enters the light-collecting system 209.

The light-collecting system 209 consists of a light-collecting device 210 and a light guide plate 206 as a guide member to lead light to the light-collecting device 210. The light-collecting device 210 consists of (1) a longer reflecting member 211 where the inner surface is a mirror surface-like light reflecting surface, and (2) photomultipliers 12 and 13 as photo-detectors to detect the incoming light installed on both ends of said reflecting member 211.

As shown in FIG. 12, the cross section vertical to longitudinal direction of the reflecting member 211 in the present embodiment is designed so that one circle is formed by the cross section of the light reflecting surface 211a. The light reflecting surface 211a has the similar reflection characteristics as that of the light reflecting surface 11a in the first embodiment.

The light having entered from the light-incoming aperture 251 of the reflecting member 211 is reflected by the light reflecting surface 211a in the forward direction. The light having contacted the light reflecting surface 211 changes the direction of reflection to the reverse direction and comes out of the light-incoming aperture 251 externally.

Thus, for the cross section of the reflecting member 211 in the present embodiment, light does not leak from the light-incoming aperture 251 unless reflection occurs multiple numbers of times. This is the same as in the case of the cross section of reflecting member 11 according to the first embodiment where two semicircles with different radiuses are put together.

Figure 13:
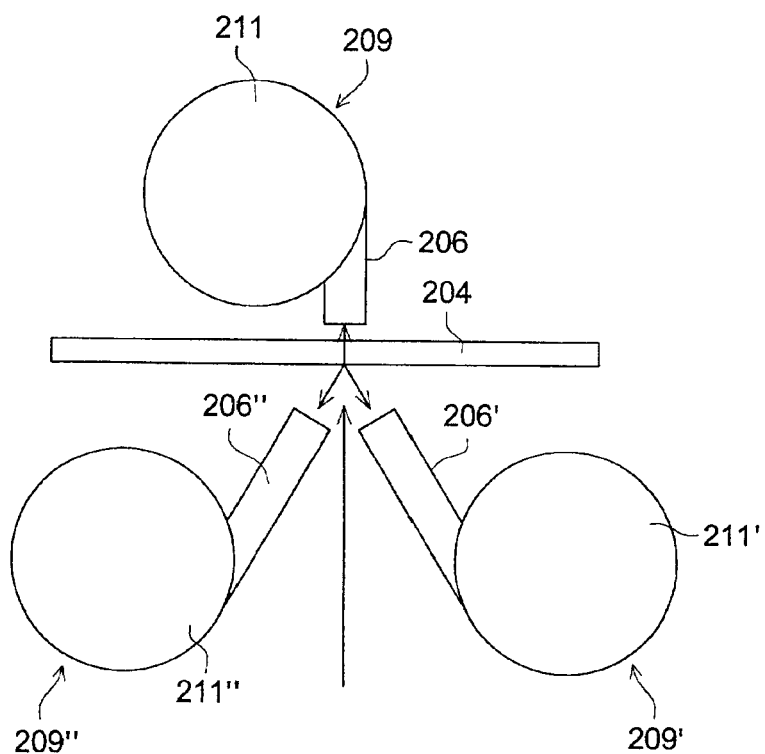
FIG. 13 is a drawing illustrating another embodiment.

The above-mentioned configuration provides the same effect as the first embodiment. It should be noted that the light-collecting system 209 is used to collect light on the back side of the photo stimulable storage phosphor sheet 204 in the above-mentioned configuration. As shown in FIG. 3, it is also possible to install additional light-collecting systems 209' and 209" having the same configuration as the light-collecting system 209, and to collect light emitted on the back and surface of the photo stimulable storage phosphor sheet 204, using a total of three light-collecting systems 209, 209' and 209"". FIG. 13 shows the reflecting surface without the peripheral surface of the light-collecting device.

It is also possible to collect light emitted on the back and surface of the photo stimulable storage phosphor sheet 204, using two light-collecting systems, namely, a light-collecting system 209 and either light-collecting system 209' or 209". It is also possible to collect light emitted on the back of the photo stimulable storage phosphor sheet 204 using only light-collecting systems 209' and 209", without the light-collecting system 209.

Said embodiment was explained with reference to the example of using the photo stimulable storage phosphor sheet. It goes without saying that the explanation also applies to the reading system to read the document transmissive to light such as film.

(3) Third Embodiment

Figure 14:
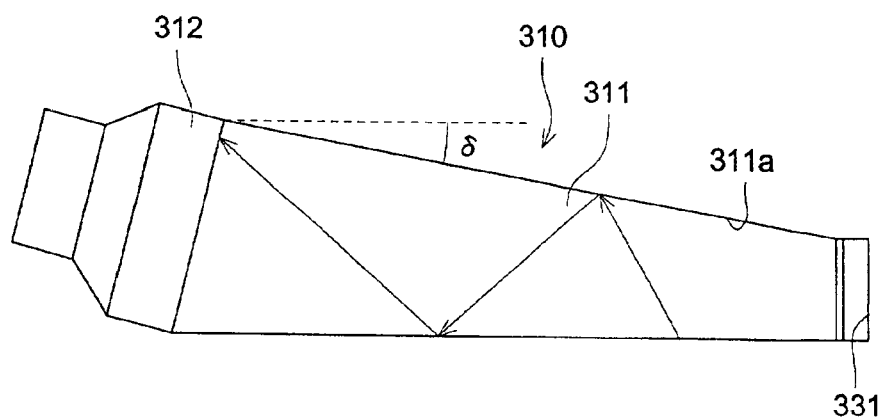
FIG. 14 is a main component configuration diagram illustrating a third embodiment.

The following describes the third embodiment with reference to FIG. 14 as a main component configuration diagram illustrating a third embodiment: The reflecting member in FIG. 14 shows only the reflecting surface without peripheral portion.

In the first and second embodiments, Taper is provided in the longitudinal direction to ensure that the area of the cross section of the reflecting member 11 is smaller at the center side than at the end where photomultipliers 12 and 13 are laid out. In the present embodiment, the reflecting member 311 of the light-collecting device 310 has a photomultiplier 312 installed on one end. Taper is provided to ensure that the area of the cross section vertical to longitudinal direction of the reflecting member 311 is gradually reduced at the end where the photomultiplier 312 is not placed than at the end where it is placed.

A reflection mirror 331 provided with reflection enhancing coating is installed as an end reflecting member at the end where the photomultiplier 312 is not placed. According to this configuration, part of light entering the reflecting member 311 of the light-collecting device 310 directly enters the light receiving surface of the photomultiplier 312, and part of it is reflected by the light reflecting surface 311a of the reflecting member 311 to enter the light receiving surface of the photomultiplier 312. After multiple reflections inside the reflecting member 311, part of light entering in the direction opposite to the photomultiplier 312 to changes direction to go to the photomultiplier 312. The part of remaining light is reflected by the reflection mirror 331 to enter the photoelectric surface of the photomultiplier 312 after multiple reflections inside the reflecting member 311.

The above-mentioned configuration provides the same effect as the first embodiment. Leakage of light from the reflecting member end 311 of the light-collecting device 310 is eliminated by installation of a reflection mirror 331 on the side where the photomultiplier 312 is not installed. Thus, the light containing image information can be sent to the photodetector with high efficiency. Hence, the image information with excellent SN ratio can be obtained or image information reading time can be reduced.

(4) Fourth Embodiment

Figure 15:
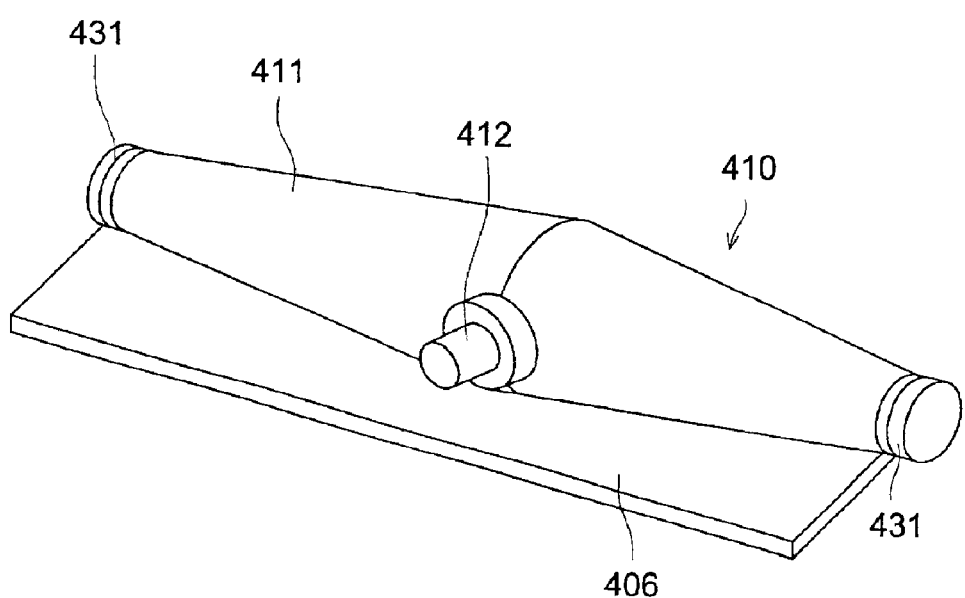
FIG. 15 is a main component configuration diagram illustrating a fourth embodiment.

The following describes the fourth embodiment with reference to FIG. 15 as a main component configuration diagram illustrating a fourth embodiment:

The reflecting member 11 of the first and second embodiments is tapered in the longitudinal direction so that the cross section of the reflecting member 11 is smaller at the central portion than at the end where photomultipliers 12 and 13 are laid out. In the reflecting member 411 of the light-collecting device 410, photomultiplier 412 is provided at the center on the side of the reflecting member 411, and taper is provided so that the area of the cross section vertical to the longitudinal direction of the reflection member 411 is greater at the center side than at the end.

An reflecting mirror 431 provided with reflection enhancing coating is installed as an end reflecting member on both sides of the reflecting member 411. According to the above-mentioned configuration, photomultiplier 412 is provided at the center on the side of the reflecting member 411, and the area of the cross section vertical to the longitudinal direction of the reflection member 411 is greater at the center side than at the end. This reduces the number of reflections inside the reflecting member 411 leading to the photomultiplier 412, and decreases attenuation by reflection.

The reduced number of reflections inside the reflecting member 411 decreases the amount of light leaking from the light-incoming aperture of the reflecting member 411 connected with a light guide plate 406, with the result that light-collecting efficiency is improved.

Thus, the light containing image information can be sent to the photomultiplier 412 with high efficiency. Hence, the image information with excellent SN ratio can be obtained and image information reading time can be reduced.

The photomultiplier 412 is provided at the center on the side of the reflecting member 411. This makes it possible to use a small-sized low-cost photo-detector, instead of a costly, longer or larger-diameter photo-detector. Further, the photomultiplier is not positioned at the end in the longitudinal direction of the light-collecting device. This allows the length in the longitudinal direction to be decreased. The above explanation is based on one photomultiplier installed at the center. Two or more can be installed. The installation position is not restricted to the center in the longitudinal direction of the light-collecting device.

Part of the light entering the reflecting member of the light-collecting device in the first to third embodiments directly enters the photomultiplier. Part of it is reflected by the reflection mirror to go to the photomultiplier. A substantial reduction in the number of reflections inside the light-collecting device can be provided, as compared with the cylindrical light-collecting device shown in FIG. 5. If the number of internal reflections is assumed as M, the relationship with the number of reflections, N, discussed in the first embodiment is M<N, there is almost no light leaking from the light-collecting device aperture. This fact is what the present inventors have found out.

In practice, the present inventors manufactured a light-collecting device characterized by excellent light-collecting efficiency when the cross section structure and taper structure meeting these requirements were provided.

Figure 16:
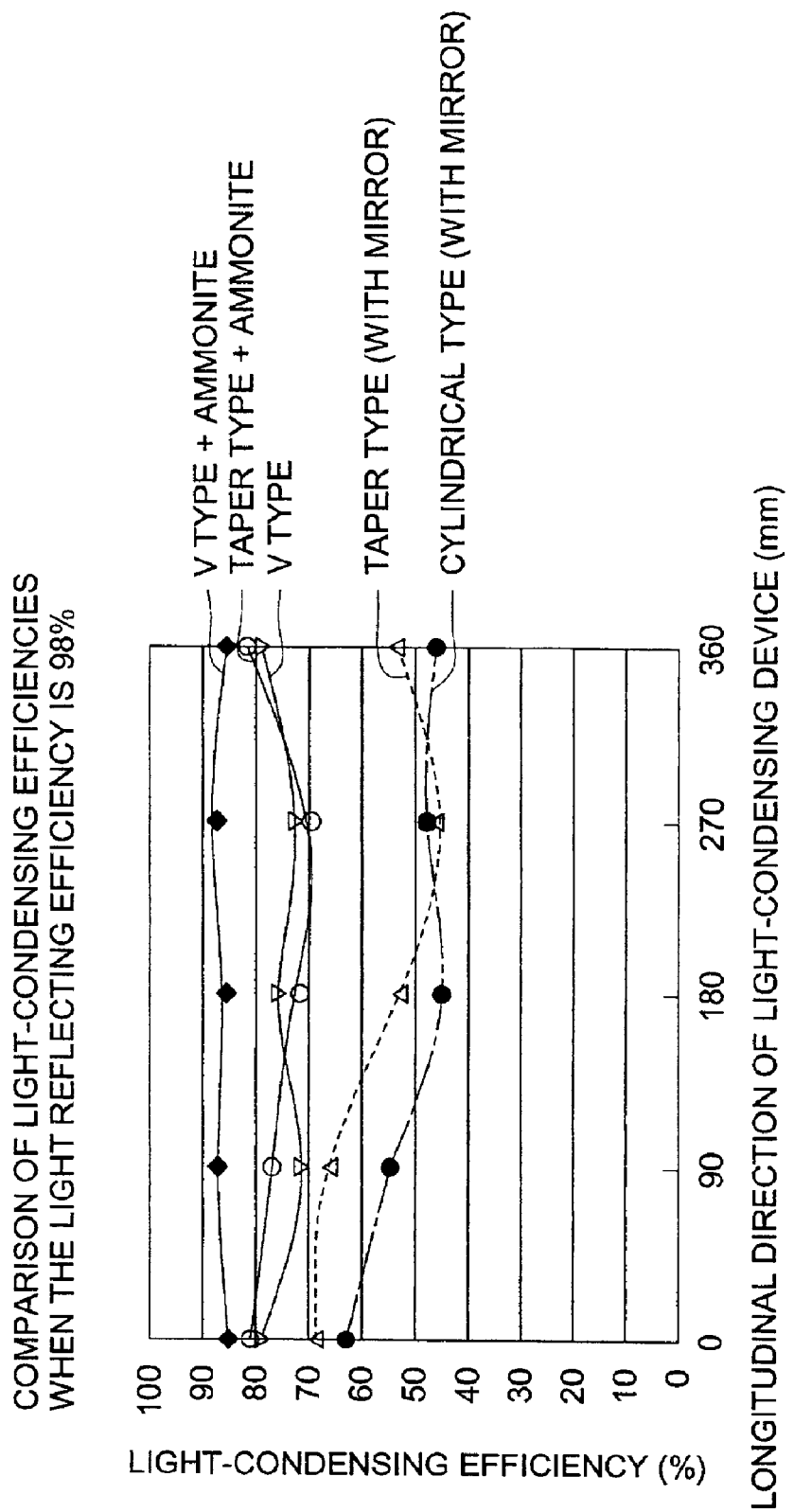
FIG. 16 is a drawing illustrating the result of testing the embodiment.

FIG. 16 gives the result of measuring the light-collecting efficiency in the longitudinal direction of various types of light-collecting devices when the light reflecting surface is 98%.

The light-collecting device of each plot is as follows:

Symbol (•): The cylindrical (with mirror) light-collecting device has a cylindrical form not tapered as shown in FIG. 5. In this light-collecting device as shown in FIG. 4, the shape of the cross section is such that the perpendicular on the end face as an ongoing surface of the guide plate is the reflecting member facing toward the center of the cross section (cross section vertical to the longitudinal direction) viewed from the longitudinal direction of the reflecting member. A photomultiplier is located on one end face and a reflection mirror is installed on the other end face.

Symbol (Δ): The tapered (with mirror) light-collecting device is tapered in such a way that the area of the cross section of the surface vertical to the longitudinal direction of the reflecting member is gradually reduced as light goes from one end to the other end, as shown in FIG. 14. The shape of the cross section is shown in FIG. 4; namely, the perpendicular on the end face as the ongoing surface of the light guide plate refers to the cross section (the cross section vertical to longitudinal direction) viewed from the longitudinal direction of the reflecting member. A photomultiplier is installed on the side of the end face with wider area, while a reflection mirror is mounted on the side of the end face with less wider area. This light-collecting device has such a structure.

Symbol (∇): The V-type light-collecting device is tapered in such a way that the area of the cross section of the surface vertical to the longitudinal direction of the reflecting member as shown in FIG. 3 is gradually reduced as light goes from the central side to the end. As shown in FIG. 4, the shape of the cross section is the reflecting member wherein the perpendicular on the end face the ongoing surface of the =light guide plate faces toward the center of the cross section (the cross section vertical to longitudinal direction) viewed from the longitudinal direction of the reflecting member, and the photomultiplier is provided on the side of both end faces in this light-collecting device.

Symbol (Ø): The taper type of the taper type+ammonite light-collecting device refers to the type shown in FIG. 14 which is tapered in such a way that the area of the cross section of the surface vertical the longitudinal direction of the reflecting member is gradually reduced as light goes to one end to the other end. The ammonite refers to the type of the light-collecting device where the shape of the cross section is shown in FIG. 2 which. Namely, the perpendicular on the end face as the ongoing surface of the light guide member is misaligned with the central direction of the cross section (the cross section vertical to longitudinal direction) viewed from the longitudinal direction of the reflecting member. In the cross section vertical to the longitudinal direction of the reflecting member, the light reflecting surface as an inner surface of the reflecting member consists of a combination of two arcs of two circles having different curvature radiuses, wherein the center of each semicircle is misaligned in this reflecting member. A photomultiplier is installed on the end face with wider area and a reflection mirror is mounted on the end face with less wide area in this light-collecting device.

Symbol (♦): "V type" in "V type+ammonite light-collecting device" means that taper is provided so that the area of the cross section vertical to longitudinal direction of the reflecting member shown in FIG. 3 is smaller at the center side than at the end. The ammonite refers to the type of the light-collecting device where the shape of the cross section is shown in FIG. 2 which. Namely, the perpendicular on the end face as the ongoing surface of the light guide member is misaligned with the central direction of the cross section (the cross section vertical to longitudinal direction) viewed from the longitudinal direction of the reflecting member. In the cross section vertical to the longitudinal direction of the reflecting member, the light reflecting surface as an inner surface of the reflecting member consists of a combination of two arcs of two circles having different curvature radiuses, wherein the center of each semicircle is misaligned in this reflecting member. A photomultiplier is installed on both end faces in this light-collecting device.

As can be seen from the Figure, light-collecting efficiency is 70% or more for the V type light-collecting device of plot ∇, and is 85% or more for the V type+ammonite light-collecting device of plot ♦.

When consideration is given to the fact that the sensitivity of photoelectric surface of the shorter photomultiplier used in the present invention is about 1.5 times that of the photoelectric surface of the longer photomultiplier, replacement is sufficiently possible in terms of SN as well.

Further, this measurement data represents the light-collecting efficiency when the reflection rate of light reflecting surface of the reflecting member of the light-collecting device is 98%. Light-collecting efficiency can be further increased by improving the reflecting surface performances.

From the above description, it can be confirmed that use of the light-collecting device according to the present invention eliminates the need of using a large sized light-collecting guide or a very expensive longer photomultiplier which have been used so far. It provides a great advantage of making it possible to create a small sized low cost image reading system and to ensure improved SN.

As described above, the present invention provides the following effects:

(1) According to the present invention, the shape of said light reflecting surface and the position of said light-incoming aperture are set in such a way as to ensure that reflection is repeated so that the light having entered through said light-incoming aperture rotates in one direction, as viewed from the direction vertical to the longitudinal direction of said reflecting member. This configuration ensures that light does not leak from the light-incoming aperture while the light having entered the light-collecting device rotates in one direction. Thus, there is a decrease in the amount of light leaking from the light-incoming aperture before light reaches the photo-detector, and the light containing image information can be led to the photo-detector with high efficiency, thereby ensuring image information with excellent SN ratio, or reducing image information reading time.

(2) According to the present invention, said reflecting member is sufficiently long in the longitudinal direction, and the shape of said light reflecting surface and the position of said light-incoming aperture are set to ensure that reflection is repeated so that the light coming from said light-incoming aperture rotates in one direction, as viewed from the direction vertical to the longitudinal direction of said reflecting member and, after that, reflection is repeated so that said light rotates in the direction reverse to said direction.

Thus, light does not leak from the light-incoming aperture while the light entering the light-collecting device rotates in one direction.

Even if said light rotates in the direction reverse to one direction, light does not leak if light fails to enter the light-incoming aperture.

This reduces the amount of light leaking from the light-incoming aperture before light reaches the photo-detector. The light containing image information can be sent to the photo-detector with high efficiency. Thus, the image information with excellent SN ratio can be obtained and image information reading time can be reduced.

If the reflecting member is sufficiently long in the longitudinal direction, reflection is repeated so that much light rotates in one direction. After that, reflection is repeated so that light rotates in the direction reverse to said direction. As the reflecting member is reduced in the longitudinal direction, there is a decrease in the amount of light which repeats reflection by rotating in the direction reverse to one direction, and an increase in the amount of light which repeats reflection by rotating in one direction. Namely, there is an increase in the amount of light reaching the end of the reflecting member in the longitudinal direction before repeating reflection by rotation in the direction reverse to one direction.

(3) According to the present invention, the perpendicular of said light-incoming aperture is misaligned with the center direction of the cross section of the surface vertical to the longitudinal direction of said light-collecting device. This increases the number of reflections until the light coming from said light-incoming aperture leaks from the light-incoming aperture.

This also reduces the amount of light leaking from the light-incoming aperture before light reaches the photo-detector. The light containing image information can be sent to the photo-detector with high efficiency. Thus, the image information with excellent SN ratio can be obtained and image information reading time can be reduced.

(4) According to the present invention, said reflecting member has a circular arc light reflecting surface having at least two curvature radiuses. This allows reflection to be repeated so that much light rotates in one direction; then reflection is repeated so that light rotates in the direction reverse to said direction.

Thus, there is a decrease in the amount of light leaking from the light-incoming aperture before reaching the photo-detector. The light containing image information can be I led to the photo-detector with high efficiency, thereby ensuring image information with excellent SN ratio, or reducing image information reading time.

(5) According to the present invention, said reflecting member has a light reflecting surface comprising multiple plane surfaces inscribing or circumscribing a circular arc light reflecting surface having at least two curvature radiuses. This allows reflection to be repeated so that light rotates in one direction; then reflection is repeated so that light rotates in the direction reverse to said direction.

Thus, there is a decrease in the amount of light leaking from the light-incoming aperture before reaching the photo-detector. The light containing image information can be led to the photo-detector with high efficiency, thereby ensuring image information with excellent SN ratio, or reducing image information reading time.

(6) According to the present invention, on the cross section vertical to the longitudinal direction of said reflecting member, said reflecting member has a circular arc light reflecting surface having at least two curvature radiuses, or a light reflecting surface comprising multiple plane surfaces inscribing or circumscribing a circular arc having at least two curvature radiuses. This allows reflection to be repeated so that light rotates in one direction; then reflection is repeated so that light rotates in the direction reverse to said direction. Thus, there is a decrease in the amount of light leaking from the light-incoming aperture before reaching the photo-detector. The light containing image information can be led to the photo-detector with high efficiency, thereby ensuring image information with excellent SN ratio, or reducing image information reading time.

(7) According to the present invention, said photo-detector is installed on each end of said reflecting member, and the cross section of the surface vertical to the longitudinal direction of said reflecting member is smaller at the central portion than at the end. In other words, the diameter increases from the center of the reflecting member toward both ends. This configuration reduces the number of reflections within the reflecting member until the photo-detector is reached, and decreases attenuation due to reflection.

Further, the decreased number of reflections reduces the amount of light leaking from the light-incoming aperture, and increases light-collecting efficiency. Thus, the light containing image information can be sent to the photo-detector with high efficiency. Hence, the image information with excellent SN ratio can be obtained or image information reading time can be reduced.

Further, a photo-detector is installed on each end of the long reflecting member. This allows use of a small-sized low-cost photo-detector, instead of a costly, longer or larger-diameter photo-detector.

In addition, installation of a photo-detector on each end of the reflecting member reduces the length of a light path from the incoming position to the photo-detector. Thus, the light containing image information can be led to the photo-detector with high efficiency, thereby ensuring image information with excellent SN ratio, or reducing image information reading time.

(8) According to the present invention, said reflecting member has either lustrous metal or multi-layer coating. This ensures a high reflection rate and reduces light attenuation.

Thus, the light containing image information can be led to the photo-detector with high efficiency, thereby ensuring image information with excellent SN ratio, or reducing image information reading time.

(9) According to the present invention, said reflecting member having a wavelength selectivity reduces the reflection rate of light which becomes noise other than frequency of light including image information.

Further, it also eliminates the need of a filter having wavelength selectivity or permits the performances thereof to be reduced. Thus, the SN ratio of the light containing image information received by the detector can be improved, thereby ensuring image information with excellent SN ratio, or reducing image information reading time.

(10) According to the present invention, the cross section of the surface vertical to the longitudinal direction of said reflecting member is smaller as light goes from the end equipped with said photo-detector to the end without it. In other words, the area of the cross section is reduced as light goes from the end of the reflecting member provided with said photo-detector toward the end without it. This configuration reduces the number of reflections within the reflecting member until the photo-detector is reached, and decreases attenuation due to reflection.

Further, the decreased number of reflections reduces the amount of light leaking from the light-incoming aperture, and increases light-collecting efficiency. Thus, the light containing image information can be sent to the photo-detector with high efficiency. Hence, the image information with excellent SN ratio can be obtained or image information reading time can be reduced.

Further, the photo-detector installed on the end of the reflecting member allows use of a small-sized low-cost photo-detector, instead of a costly, longer or larger-diameter photo-detector.

In addition, installation of the photo-detector on one end of the reflecting member reduces costs.

(11) According to the present invention, said photo-detector is installed at the center on the side of said reflecting member, and the cross section of the surface vertical to the longitudinal direction of said reflecting member is greater at the central portion than at the end. This configuration reduces the number of reflections within the reflecting member until the photo-detector is reached, and decreases attenuation due to reflection.

Further, the decreased number of reflections reduces the amount of light leaking from the light-incoming aperture, and increases light-collecting efficiency. Thus, the light containing image information can be sent to the photo-detector with high efficiency. Hence, the image information with excellent SN ratio can be obtained or image information reading time can be reduced.

Further, the photo-detector installed at the center on the side of said reflecting member allows use of a small-sized low-cost photo-detector, instead of a costly, longer or larger-diameter photo-detector.

(12) According to the present invention, an end reflecting member is installed on one of two ends of said reflecting member where the photo-detector is not installed. This eliminates the amount of light leaking from the end of the light-collecting device. Thus, the light containing image information can be sent to the photo-detector with high efficiency. Hence, the image information with excellent SN ratio can be obtained or image information reading time can be reduced.

(13) According to the present invention, said end reflecting member having either lustrous metal or multi-layer coating ensures increased reflection rate and decreased light attenuation.

Thus, the light containing image information can be sent to the photo-detector with high efficiency. Hence, the image information with excellent SN ratio can be obtained or image information reading time can be reduced.

(14) According to the present invention, said reflecting member having a wavelength selectivity reduces the reflection rate of light which becomes noise other than frequency of light including image information.

Further, it also eliminates the need of a filter having wavelength selectivity or permits the performances thereof to be reduced.

Thus, the SN ratio of the light containing image information received by the detector can be improved, thereby ensuring image information with excellent SN ratio, or reducing image information reading time.

(15) According to the present invention, an optical filter having wavelength selectivity is installed either on the light receiving surface of said photo-detector or in the vicinity of said light-incoming aperture. This reduces the light which becomes noise other than frequency of light including image information.

Thus, the SN ratio of the light containing image information received by the detector can be improved, thereby ensuring image information with excellent SN ratio, or reducing image information reading time.

(16) According to the present invention, a light guide member installed to lead light to the light-incoming aperture of said light-collecting device increases the degree of freedom in the layout of the system, and allows flexible system configuration.

(17) According to the present invention, said light-collecting device being the one according to any one of claims 1 to 15 allows use of a small-sized low-cost photo-detector, instead of a costly, longer or larger-diameter photo-detector.

Further, the light containing image information can be sent to the photo-detector with high efficiency. Hence, the image information with excellent SN ratio can be obtained or image information reading time can be reduced.

(18) According to the present invention, the perpendicular of the ongoing surface of said light guide member is misaligned with the center of the cross section of the surface vertical to the longitudinal direction of said light-collecting device. This increases the number of reflections until the light coming from light-incoming aperture of the reflecting member of the light-collecting device leaks from the light-incoming aperture.

Thus, there is a decrease in the amount of light leaking from the light-incoming aperture before reaching the photo-detector. The light containing image information can be led to the photo-detector with high efficiency, thereby ensuring image information with excellent SN ratio, or reducing image information reading time.

(19) According to the present invention, aid light guide member is designed to ensure that the width in the longitudinal direction is smaller at the ongoing aperture than at the light-incoming aperture. This makes it possible to decrease the width of the longitudinal direction (horizontal scanning direction) of the light-incoming aperture of the light-collecting device. In other words, it is possible to reduce the length of the longitudinal direction of the light-collecting device and to reduce the system size, without deteriorating the picture quality.

(20) According to the present invention, said light guide member is designed so that only the thickness in the direction vertical to the longitudinal direction is smaller at the ongoing aperture than at the light-incoming aperture. This makes it possible to reduce the area of the light-incoming aperture in the reflecting member.

Thus, there is a decrease in the amount of light leaking from the light-incoming aperture, and the light containing image information can be led to the photo-detector with high efficiency, thereby ensuring image information with excellent SN ratio, or reducing image information reading time.

(21) According to the present invention, reflection preventive coating is provided on either the incoming surface or ongoing surface of said light guide member. This makes it possible to reduce the light reflection in either the incoming surface or ongoing surface of the light guide.

Thus, the light containing image information can be led to the photo-detector with high efficiency.

This ensures image information with excellent SN ratio, or reduces image information reading time.

(22) According to the present invention, said light-collecting device is a light-collecting device according to any one of claims 1 to 15. This allows use of a small-sized low-cost photo-detector, instead of a costly, longer or larger-diameter photo-detector.

The light containing image information can be led to the photo-detector with high efficiency, thereby ensuring image information with excellent SN ratio, or reducing image information reading t

(23) According to the present invention, when the light-collecting system according to any one of claims 16 to 21 is provided, it is possible to increases the degree of freedom in the layout of the light-collecting device and allows flexible system configuration.

It is also possible to use a small-sized low-cost photo-detector, instead of a costly, longer or larger-diameter photo-detector.

Further, the light containing image information can be sent to the photo-detector with high efficiency. Hence, the image information with excellent SN ratio can be obtained or image information reading time can be reduced.

(24) According to the present invention, said light-collecting device is the one according to any one of claims 1 to 15. This allows use of a small-sized low-cost photo-detector, instead of a costly, longer or larger-diameter photo-detector.

Further, the light containing image information can be sent to the photo-detector with high efficiency. Hence, the image information with excellent SN ratio can be obtained or image information reading time can be reduced.

(25) According to the present invention, when the light-collecting system according to any one of claims 16 to 21 is provided, it is possible to increases the degree of freedom in the layout of the light-collecting device and allows flexible system configuration.

It is also possible to use a small-sized low-cost photo-detector, instead of a costly, longer or larger diameter photo-detector.

Further, the light containing image information can be sent to the photo-detector with high efficiency. Hence, the image information with excellent SN ratio can be obtained or image information reading time can be reduced.

Disclosed embodiment can be varied by a skilled person without departing from the spirit and scope of the invention.

What is claimed is:

1. A light-collecting device, comprising:
a reflector, shaped like a longish cylinder, a surface of which is a light-reflecting surface finished as a mirror surface; and
a photo-detector to detect light residing inside said reflector;
wherein said reflector comprises a light-incoming aperture to guide light inside said reflector, and a perpendicular line at said light-incoming aperture is shifted from a center line of a cross-section perpendicular to a longitudinal direction of said reflector.

2. The light-collecting device of claim 1,
wherein said light-reflecting surface comprises at least two arc surfaces whose radiuses of curvatures are different relative to each other.

3. The light-collecting device of claim 1,
wherein said light-reflecting surface comprises a plurality of plane surfaces, which are inscribed or circumscribed onto at least two arcs whose radiuses of curvatures are different relative to each other.

4. The light-collecting device of claim 1,
wherein an area of said cross-section perpendicular to a longitudinal direction of said reflector increases as said cross-section shifts towards an end section of said reflector, at which said photo-detector is disposed.

5. A light-collecting device, comprising:
a reflector, shaped like a longish cylinder, a surface of which is a light-reflecting surface finished as a mirror surface; and
a photo-detector to detect light residing inside said reflector;
wherein said reflector comprises a light-incoming aperture to guide light inside said reflector, and an area of a cross-section perpendicular to a longitudinal direction of said reflector increases as said cross-section shifts towards an end section of said reflector, at which said photo-detector is disposed.

6. The light-collecting device of claim 5,
wherein said light-reflecting surface comprises at least two arc surfaces whose radiuses of curvatures are different relative to each other.

7. The light-collecting device of claim 5,
wherein said light-reflecting surface comprises a plurality of plane surfaces, which are inscribed or circumscribed onto at least two arcs whose radiuses of curvatures are different relative to each other.

8. A light-collecting device, comprising:
a reflector, having a light-incoming aperture and shaped like a longish cylinder, a surface of which is a light-reflecting surface finished as a mirror surface; and
a photo-detector to detect light residing inside said reflector;
wherein said light-reflecting surface comprises either at least two arc surfaces, whose radiuses of curvatures are different relative to each other, or a plurality of plane surfaces, which are inscribed or circumscribed onto at least two arcs whose radiuses of curvatures are different relative to each other.

9. The light-collecting device of claim 8,
wherein said photo-detector is disposed at each of both end portions of said reflector, and a cross-sectional area of said reflector at a center portion perpendicular to a longitudinal direction of said reflector is smaller than that at each of said end portions.

10. The light-collecting device of claim 8,
wherein said photo-detector is disposed at an end portion of said reflector, and a cross-sectional area perpendicular to a longitudinal direction of said reflector decreases, as said cross-sectional area shifts towards another end portion of said reflector, at which said photo-detector is not disposed, from said end portion of said reflector, at which said photo-detector is disposed.

11. The light-collecting device of claim 8,
wherein said photo-detector is disposed at a side surface of a center portion of said reflector, and a cross-sectional area of said reflector at said center portion perpendicular to a longitudinal direction of said reflector is larger than that at each of both end portions of said reflector.

12. The light-collecting device of claim 8,
wherein said reflector comprises a glossy metal and/or a multi-layer coating.

13. The light-collecting device of claim 8,
wherein said reflector has a wavelength selectivity.

14. The light-collecting device of claim 8,
wherein an end-reflecting member is attached to an end of said reflector, at which said photo-detector is not disposed.

15. The light-collecting device of claim 14,
wherein said end-reflecting member comprises a glossy metal and/or a multi-layer coating.

16. The light-collecting device of claim 14,
wherein said end-reflecting member has a wavelength selectivity.

17. The light-collecting device of claim 8,
wherein an optical filter, having a wavelength selectivity, is disposed at a light-receiving surface of said photo-detector, and/or in the vicinity of said light-incoming aperture.

18. A light-collecting device, comprising:
a reflector, having a light-incoming aperture and shaped like a longish cylinder, a surface of which is a light-reflecting surface finished as a mirror surface; and
a photo-detector to detect light residing inside said reflector;
wherein a shape of said light-reflecting surface and a position of said light-incoming aperture are established so that a light entered from said light-incoming aperture is repeatedly reflected by said light-reflecting surface so as to rotate in a constant direction in said reflector, viewed from a direction perpendicular to a longitudinal direction of said reflector.

19. The light-collecting device of claim 18,
wherein a perpendicular line at said light-incoming aperture is shifted from a center line of a cross-section perpendicular to a longitudinal direction of said reflector.

20. The light-collecting device of claim 18,
wherein said light-reflecting surface comprises at least two arc surfaces whose radiuses of curvatures are different relative to each other.

21. The light-collecting device of claim 18,
wherein said light-reflecting surface comprises a plurality of plane surfaces, which are inscribed or circumscribed onto at least two arcs whose radiuses of curvatures are different relative to each other.

22. The light-collecting device of claim 18,
wherein said light-incoming aperture guides said light inside said reflector, and an area of a cross-section perpendicular to a longitudinal direction of said reflector increases as said cross-section shifts towards an end section of said reflector, at which said photo-detector is disposed.

23. A light-collecting device, comprising:

a reflector, having a light-incoming aperture and shaped like a longish cylinder, a surface of which is a light-reflecting surface finished as a mirror surface; and a photo-detector to detect light residing inside said reflector;

wherein said reflector is sufficiently long in its longitudinal direction, and a shape of said light-reflecting surface and a position of said light-incoming aperture are established so that, viewed from a direction perpendicular to a longitudinal direction of said reflector, after a light entered from said light-incoming aperture is repeatedly reflected by said light-reflecting surface so as to rotate in a constant direction in said reflector, said light is repeatedly reflected again by said light-reflecting surface so as to rotate in a direction reverse to said constant direction.

24. The light-collecting device of claim 23, wherein a perpendicular line at said light-incoming aperture is shifted from a center line of a cross-section perpendicular to a longitudinal direction of said reflector.

25. The light-collecting device of claim 23, wherein said light-reflecting surface comprises at least two arc surfaces whose radiuses of curvatures are different relative to each other.

26. The light-collecting device of claim 23, wherein said light-reflecting surface comprises a plurality of plane surfaces, which are inscribed or circumscribed onto at least two arcs whose radiuses of curvatures are different relative to each other.

27. The light-collecting device of claim 23, wherein said light-incoming aperture guides said light inside said reflector, and an area of a cross-section perpendicular to a longitudinal direction of said reflector increases as said cross-section shifts towards an end section of said reflector, at which said photo-detector is disposed.

28. A light-collecting device, comprising:

a reflector, shaped like a longish cylinder, a surface of which is a light-reflecting surface finished as a mirror surface, said reflector comprising a light-incoming aperture to guide light inside said reflector;

a light-guiding member, shaped like a longish element and disposed at said light-incoming aperture, to guide said light in a direction shifted from a center line of a cross-section perpendicular to a longitudinal direction of said reflector; and a photo-detector to detect said light residing inside said reflector.

29. The light-collecting device of claim 28, wherein said light-guiding member includes a light-input opening and a light-output opening through which said light is guided inside said reflector, and said light-guiding member is formed in such a shape that a width of said light-output opening is shorter than that of said light-input opening in a longitudinal direction of said light-guiding member.

30. The light-collecting device of claim 28, wherein said light-guiding member includes a light-input opening and a light-output opening, through which said light is guided inside said reflector, and said light-guiding member is formed in such a shape that a thickness of said light-output opening is thinner than that of said light-input opening in a direction perpendicular to a longitudinal direction of said light-guiding member.

31. The light-collecting device of claim 28, wherein an antireflection coating is applied onto both/either an input-surface and/or an output-surface of said light-guiding member.

32. The light-collecting device of claim 28, wherein a perpendicular line at said light-incoming aperture is shifted from a center line of a cross-section perpendicular to a longitudinal direction of said reflector.

33. The light-collecting device of claim 28, wherein said light-reflecting surface comprises at least two arc surfaces whose radiuses of curvatures are different relative to each other.

34. The light-collecting device of claim 28, wherein said light-reflecting surface comprises a plurality of plane surfaces, which are inscribed or circumscribed onto at least two arcs whose radiuses of curvatures are different relative to each other.

35. The light-collecting device of claim 28, wherein an area of a cross-section perpendicular to a longitudinal direction of said reflector increases as said cross-section shifts towards an end section of said reflector, at which said photo-detector is disposed.

36. An image information reading apparatus for reading image information recorded on a sheet by scanning a light-beam on said sheet and detecting light corresponding to said image information recorded on said sheet by means of a photo-detector, comprising:

a light-collecting device cited in claim 1.

37. The image information reading apparatus of claim 36, wherein said light is either illuminating light, transmitting light or reflecting light corresponding to said image information recorded on said sheet.

38. An image information reading apparatus for reading image information recorded on a sheet by scanning a light-beam on said sheet and detecting light corresponding to said image information recorded on said sheet by means of a photo-detector, comprising:

a light-collecting device cited in claim 5.

39. The image information reading apparatus of claim 38, wherein said light is either illuminating light, transmitting light or reflecting light corresponding to said image information recorded on said sheet.

40. An image information reading apparatus for reading image information recorded on a sheet by scanning a light-beam on said sheet and detecting light corresponding to said image information recorded on said sheet by means of a photo-detector, comprising:

a light-collecting device cited in claim 8.

41. The image information reading apparatus of claim 40, wherein said light is either illuminating light, transmitting light or reflecting light corresponding to said image information recorded on said sheet.

42. An image information reading apparatus for reading image information recorded on a sheet by scanning a light-beam on said sheet and detecting light corresponding to said image information recorded on said sheet by means of a photo-detector, comprising:

a light-collecting device cited in claim 18.

43. The image information reading apparatus of claim 42, wherein said light is either illuminating light, transmitting light or reflecting light corresponding to said image information recorded on said sheet.

44. An image information reading apparatus for reading image information recorded on a sheet by scanning a light-beam on said sheet and detecting light corresponding to said image information recorded on said sheet by means of a photo-detector, comprising:

a light-collecting device cited in claim 23.

45. The image information reading apparatus of claim 44, wherein said light is either illuminating light, transmitting light or reflecting light corresponding to said image information recorded on said sheet.

46. An image information reading apparatus for reading image information recorded on a sheet by scanning a light-beam on said sheet and detecting light corresponding to said image information recorded on said sheet by means of a photo detector, comprising:

a light-collecting device cited in claim 28.

47. The image information reading apparatus of claim 46, wherein said light is either illuminating light, transmitting light or reflecting light corresponding to said image information recorded on said sheet.

\* \* \* \* \*

UNITED STATES PATENT AND TRADEMARK OFFICE
CERTIFICATE OF CORRECTION

PATENT NO.     : 6,862,118 B2
DATED          : March 1, 2005
INVENTOR(S)    : Kiyoshi Ishimoto et al.

It is certified that error appears in the above-identified patent and that said Letters Patent is hereby corrected as shown below:

Title page,
Item [57], ABSTRACT,
Line 2, "an information" should read -- an image information --.

Signed and Sealed this

Thirteenth Day of September, 2005

JON W. DUDAS
*Director of the United States Patent and Trademark Office*